United States Patent [19]
Schindler et al.

[11] Patent Number: 5,969,046
[45] Date of Patent: Oct. 19, 1999

[54] REACTING METHYLENE AND ALKENE COMPONENTS IN PRESENCE OF TERTIARY AMINE REACTED WITH EPOXIDE

[75] Inventors: F. J. Schindler, Fort Washington; M. J. Hurwitz, Elkins Park; M. H. Wolfersberger, Bedminster Township; R. L. Fulton, Jr., Ambler; W. E. Feely, Rydal, all of Pa.

[73] Assignee: Rohm and Haas Company, Phila, Pa.

[21] Appl. No.: 07/683,126

[22] Filed: Apr. 9, 1991

Related U.S. Application Data

[63] Continuation of application No. 07/338,433, Apr. 13, 1989, abandoned, which is a continuation of application No. 06/952,122, Nov. 18, 1986, abandoned.

[51] Int. Cl.$^6$ .......................... C08L 33/14; C08L 63/00; C08L 67/02; C08L 67/06
[52] U.S. Cl. .................. 525/108; 525/107; 525/111; 525/166; 525/168; 525/169; 525/170; 525/175; 525/176; 525/208; 525/438
[58] Field of Search ...................... 525/108, 111, 525/107, 166, 168, 169, 170, 175, 176, 208, 438

[56] References Cited

U.S. PATENT DOCUMENTS

| | | | |
|---|---|---|---|
| 3,459,790 | 8/1969 | Smith | 430/527 |
| 3,864,133 | 2/1975 | Hisamatsu et al. | 522/96 |
| 4,191,674 | 3/1980 | Wismer et al. | 524/901 |
| 4,221,889 | 9/1980 | Rowe | 525/922 |
| 4,408,018 | 10/1983 | Bartman et al. | 525/153 |
| 4,544,715 | 10/1985 | Paar et al. | 524/901 |
| 4,644,036 | 2/1987 | Walz et al. | 523/414 |
| 4,645,805 | 2/1987 | Gaku et al. | 525/437 |
| 4,795,787 | 1/1989 | Walz | 523/414 |
| 4,804,715 | 2/1989 | Leonard et al. | 525/530 |
| 4,871,822 | 10/1989 | Brindöpke et al. | 526/318.2 |

FOREIGN PATENT DOCUMENTS

| | | | |
|---|---|---|---|
| 3324211 | 1/1985 | Germany . | |
| 57-83568 | 5/1982 | Japan | 525/524 |

OTHER PUBLICATIONS

Chemical abstracts No. 102(6):47434; to German Patent No. 3,315,469, Walz et al., Oct. 31, 1984.

*Primary Examiner*—Robert E. Sellers
*Attorney, Agent, or Firm*—Ronald D. Bakule, Patent Agent

[57] ABSTRACT

A method for reacting a methylene-containing component such as an acrylic polymer prepared from acetoacetoxyalkyl (meth)acrylate and an alkene-containing component such as a polyfumarate, polymaleate, a polyester containing both fumarate and maleate groups or a polyacrylate comprises the reaction of a tertiary amine such as triethylene diamine and an epoxide such as a glycidyl-functional (meth)acrylic polymer in the presence of the methylene-containing component and alkene-containing component. The tertiary amine can be incorporated into the alkene-containing component such as the reaction of an unsaturated polyester with a compound having both tertiary amine and primary or secondary amine groups. The tertiary amine can be incorporated into the methylene-containing component such as an acrylic polymer derived from a tertiary amino-functional monmer and acetoacetoxyalkyl (meth)acrylate. The epoxide can be incorporated into the methylene-containing component such as an acrylic polymer obtained from glycidyl (meth)acrylate and acetoacetoxyalkyl (meth)acrylate. The epoxide can be incorporated into the alkene-containing component.

33 Claims, No Drawings

REACTING METHYLENE AND ALKENE COMPONENTS IN PRESENCE OF TERTIARY AMINE REACTED WITH EPOXIDE

This application is a continuation, of application Ser. No. 338,433, filed Apr. 13, 1989, now abandoned which is a continuation of 06/932,122, filed Nov. 18, 1986, now abandoned.

BACKGROUND OF THE INVENTION

This invention relates to ambient cure compositions based on the base-activated Carbon Michael reaction between active methylene groups and active alkene groups. More particularly, the invention is directed toward use of tertiary amines and epoxides to activate the Carbon Michael reaction. In more specific aspects, the invention is directed toward classes of active methylene groups, active alkene groups, tertiary amines and epoxides that provide low cost, color and hazard, in two-pack coatings with good pot life, cure speed, gloss and durability on exposure to high humidity and ultraviolet light. Two-pack aliphatic urethane coatings represent the best current technology and provide targets for pot life, cure speed, gloss and durability, but alternatives to urethanes are needed with advantages in economy, safety, and ease of handling, especially for coatings with low levels of volatile solvent.

Heckles, U.S. Pat. Nos. 4,217,396, 4,217,439, 4,218,515 and 4,229,505 teach crosslinked polymers from polyfunctional acrylates and difunctional acetoacetates, diacetoacetamides, ureadiacetoacetamides and cyanoacetates with diacetoacetoamides and ureadiacetoacetamides. The crosslinking is activated by strongly basic catalysts such as sodium methoxide, sodium metal, sodium ethylate, and benzyl-trimethyl ammonium methoxide.

Bartman et al, U.S. Pat. No. 4,408,018 also teaches the use of base catalysts with sufficient activity to activate Michael cure reactions, such as potassium hydroxide, tetrabutyl ammonium hydroxide, potassium amylate, sodium methoxide, potassium ethoxide and other alkali metal derivatives of alcohol, and quaternary ammonium bases. However, Bartman et al note that amines are generally not sufficiently strong to catalyze the Michael reaction between acrylic polymers having pendant acetoacetate groups and multifunctional acrylic esters.

Brindopke et al, Australian Patent No. 8540807-A teaches that strong bases such as alkali metal hydroxides or alcoholates cause yellowing and cloudiness with the acrylic polymers having pendant acetoacetate groups. They specify other active methylene compounds, with activation by diazabicyclooctane (triethylenediamine, DABCO); halides of quaternary ammonium compounds, especially fluorides; organic phosphonium salts; amidines, such as tetramethylguanidine, diazabicycloundecene, and diazabicyclononene; phosphanes; alkali metal alcoholates; and quaternary ammonium compounds, such as alkylammonium, arylammonium and/or benzylammonium hydroxides or carbonates. Brindopke et al also teach that these catalysts or catalyst mixtures can be used in the presence of tertiary aliphatic amines which in themselves are not active at room temperature. Brindopke et al teach use of a broad range of compounds having at least two active alkene groups, excluding only those taught by Bartman et al. They specifically include derivatives of cinnamic acid, crotonic acid, citraconic acid or anhydride, mesaconic acid, fumaric acid, dehydrolevulinic acid or sorbic acid, but prefer acrylic acid, methacrylic acid and/or maleic acid or anhydride.

There are problems associated with use of all of the above catalysts for cure of those Carbon Michael-Reactive components which are preferred on the basis of cost, hazard to users and reactivity at ambient temperature.

With the components taught by Bartman et al, combining good cure with pot life is problematic: at the level of base catalyst required to give good ultimate cure, the pot life of the composition is too short. By use of quaternary ammonium salts of volatile acids, this problem can be overcome, but then combination of early cure and gloss becomes problematic: with salts of carbonic acid the surface cure is too fast at levels of catalyst giving good ultimate cure, resulting in low gloss from shrinkage due to loss of solvent after the surface has crosslinked, while with salts of less volatile acids the cure is slower than desired.

Also, as mentioned by Bartman et al, combination of the required components in two stable packages is problematic: bases strong enough to activate the cure typically lose activity on extended aging when combined with either compositions having pendant acetoacetate groups or compositions having other than the most resistant classes of ester bonds. In particular, activity is lost on storage of the active base catalyst with acrylic polymers containing acetoacetoxyethyl methacrylate (AAEM) and the polyacrylate crosslinkers taught in U.S. Pat. No. 4,408,018. This severely limits the packaging options: the systems either have three packages, one for each component, or one large and one very small package, the small package containing the catalyst. It is desired to have only two packages of the same order of magnitude in size.

Similar problems exist when the Carbon Michael-reactive methylene groups are esters of acetoacetic acid other than acrylic polymers containing acetoacetoxyethyl methacrylate, or when the Carbon Michael-reactive methylene groups are esters of malonic or cyanoacetic acid.

Similar problems exist when the Carbon Michael-reactive alkene component is a polyester containing fumarate and maleate moieties. Use of such polyesters as alkene component is highly desirable because they are less irritating than most multifunctional acrylates, and also because of potential for low cost. However, in addition to these pot-life/cure, cure rate/gloss, and packaging problems associated with the activators taught previously, their utility is problematic for another reason: such polyesters give weaker compositions than desired when the Carbon Michael-reactive methylene component is low in functionality/molecule. When the Carbon Michael-reactive methylene component is high enough in molecular weight and active methylene content per molecule for good strength and hardness, as with acrylic polymers containing pendant acetoacetate moieties, achieving good gloss and durability is problematic, probably because of incompatibility or phase-separation between the relatively high molecular weight alkene and methylene components.

Still another problem with polyesters containing fumarate and maleate moieties is their susceptibility to hydrolysis. It is known to minimize this by use of 2,2-alkylsubstituted 1,3-propanediols as glycols, however then polyesters tend to be readily crystallizable with neopentyl glycol and expensive with less readily available 2,2-alkylsubstituted 1,3-propane diols.

A solution to the above problems is needed to provide alternatives to urethanes for ambient cure, especially for applications requiring exterior durability.

SUMMARY OF THE INVENTION

It has been discovered that the pot-life/cure, cure rate/gloss and packaging problems with preferred alkene-containing and methylene-containing components can be overcome by use of tertiary amines and epoxides as the main activator of Carbon Michael cure, with a key element being the occurrence of most of the reaction between tertiary amine and epoxide in the presence of both the activated alkene component and the activated methylene component. Without limiting the scope of the invention, it is believed that the activation of Carbon Michael cure results from the conversion of the tertiary amine to a quaternized nitrogen compound via reaction with the epoxy group in the presence of the Michael-reactive components. When tertiary amines are mixed with epoxides in the absence of Michael-reactive components the typical result is a complex mixture of quaternary ammonium compounds, their alkaline decomposition products, and polyether moieties from epoxy homopolymerization. It is believed that in the presence of activated methylene component the reaction between amine and epoxide forms quaternary ammonium salts with the weakly acidic methylene component, activating the methylene component for reaction with the alkene component.

Without limiting the scope of the invention, the pot-life/cure problem is believed overcome by two fundamental advantages of this method of activation. First, the pot-life is extended because the activator concentration starts at a low level, and second, the rate of formation of activator is greater in the film than in the pot because the concentrations of amine and epoxide increase due to loss of solvent.

Without limiting the scope of the invention, the cure-rate/gloss problem is believed overcome by the same mechanism as the pot-life/cure problem. The cure rate increases with time as activator is formed from reaction of amine and epoxide, allowing solvent to leave the film while it is thermoplastic, yet giving a fast cure as sufficient levels of activator are formed.

Since the tertiary amines have much lower alkalinity than alkali or quaternary ammonium bases, they can be packaged with components having high concentrations of hydrolyzable ester groups, while the alkali or quaternary ammonium bases cannot.

Triethylenediamine does not give sufficient activation of Carbon Michael cure in the absence of epoxide. However, in the presence of epoxide, triethylenediamine gives faster activation than other tertiary amines, which is useful when a fast cure rate is needed.

The activation by triethylenediamine can in fact be so fast that levels of triethylenediamine needed for complete cure give pot lives shorter than desired. This problem can be overcome by using a combination of triethylenediamine with a another tertiary amine which gives a slower rate of activation. Combination of triethylenediamine with other, less volatile amines is also preferred for optimum crosslinking of the surface of the film to give optimum mar resistance.

When both the tertiary amine component and the epoxide component are low in molecular weight and not selected according to the preferred embodiments described below, films prepared using the invention tend to blister when exposed to water. This problem is overcome by a variety of solutions involving either the amine component or the epoxide component:(1) the amine can be incorporated into the active methylene component, for example by use of acrylic copolymers that contain both pendant acetoacetate moieties and tertiary amine from amine-containing monomers such as dimethylaminoethyl methacrylate or dimethylaminopropyl methacrylamide; (2) the amine can be incorporated into the alkene component; (3) the epoxide can be incorporated into the active methylene component, for example by use of acrylic copolymers that contain both pendant acetoacetate moieties and epoxide from copolymerization of glycidyl methacrylate, or (4) the epoxide can be incorporated into the alkene component.

A preferred class of amine-containing active methylene components is derived from copolymerization of a monomer mixture containing both acetoacetate-functional and tertiary amine-functional monomers such as dimethylaminoethyl methacrylate or dimethylaminopropyl methacrylamide. The level of the tertiary amine-functional monomer is selected according to the level of the acrylic polymer in the binder, to provide, along with other amine components, the ratios of amine to epoxide specified below. The level of tertiary amine-functional monomer then is from about 2 percent by weight of total monomer for binders with a high level of acrylic to 15 percent for binders with a low level of acrylic.

A preferred class of amine-containing alkene components is derived from reaction of alkene components with compounds containing both tertiary amine and primary or secondary amine. It is believed that the primary or secondary amine reacts with the activated double bonds, giving pendant tertiary amine groups. Suprisingly, even though they are of low molecular weight, simple compounds containing both tertiary amine and primary amine (for example, dimethylaminopropylamine) or both tertiary amine and secondary amine (for example, tetramethyliminobispropylamine), give cure and water resistance similar to amine-containing alkene components. Without limiting the invention, it is believed that these compounds are incorporated into the alkene component during cure, giving compositions somewhat similar to those in which they are pre-reacted with the alkene component.

Another preferred class of low molecular weight tertiary amines is Mannich reaction products of secondary amine, formaldehyde and phenols, for example tris(dimethylaminomethyl)phenol.

The preferred epoxide components contain the epoxide group as glycidyl esters, glycidyl ethers, or epoxidation products of alpha olefins. A preferred type for economy is the commercial liquid diglycidyl ether of bisphenol A, for example EPON 828 from Shell. Other types of epoxide give slower cure, presumably because of their slower reaction rate with tertiary amines. For best water resistance, especially with low molecular weight amine components, the epoxide is incorporated in the Michael-reactive methylene or alkene component, for example by use of glycidyl methacrylate to give glycidyl esters in an acrylic copolymer containing pendant active methylene moieties. However, for economy and ease of adjustment of epoxide level, one can use low molecular weight glycidyl esters, glycidyl ethers, or epoxidation products of alpha olefins. When using the low molecular weight epoxide components, for best water resistance it is preferred to use an amine component incorporated into the Michael-reactive methylene or alkene component, or capable of reaction with one of the Michael-reactive components during cure.

A preferred method for incorporation of the epoxide in the Michael-reactive methylene component is use of acrylic polymers containing pendant acetoacetate groups, incorporating epoxide by use of a monomer mixture containing glycidyl methacrylate along with acetoacetate-functional monomer. The level of glycidyl methacrylate in the acrylic polymer is selected according to the level of acrylic polymer in the binder, the level of any other acrylic or epoxide components, and the criteria for total epoxide level discussed below. With a high level of acrylic polymer and all of the acrylic polymer containing epoxide, the glycidyl functional monomer may be as low as 4 percent in the acrylic polymer. When both an amine-functional acrylic and an epoxy-functional acrylic are used, the preferred level of glycidyl methacrylate may be 20 percent or more of the acrylic polymer with glycidyl and acetoacetate functionality.

There are three preferred ways to combine Carbon Michael-reactive, epoxide, and amine components to achieve stable packages. The epoxide can be mixed prior to use with the active methylene moieties, the Carbon Michael-reactive alkene moieties, or a combination of the Michael-reactive components.

The tertiary amine can be mixed prior to use with the active methylene moieties or the alkene moieties. When extended package stability is not required, the amine can also be mixed prior to use with a combination of the Michael-reactive components, but a slow reaction between the Michael-reactive components is often activated with this combination.

A particularly preferred method for achieving two packages of similar size is combination of the epoxide with either the active methylene moieties or the alkene moieties, and the tertiary amine with the other Carbon Michael-reactive component.

The ratio of total moles of tertiary amine groups to epoxide groups is not critical, but is usually from about 0.5 to about 1.5. Since the speed of cure increases with concentration of both amine and epoxide groups, and the presence of an excess of amine is detrimental to acid resistance and weathering resistance, it is preferred to have the ratio of tertiary amine groups to epoxide groups from about 0.5 to about 1.0.

A useful statistic for the activator level is milliequivalents of epoxide per 100 grams of all activator and Carbon Michael reactive components, based on non-volatile material. This gives a measure of the potential moles of strong base per total weight of binder. This number should exceed the level of acid in the binder by at least 2 milliequivalents/ 100 grams. When the binder contains low levels of acid, the preferred activator level is usually in the range 2–80 milliequivalents per 100 grams, and often in the range 10–40, with lower levels giving poor rate of cure and higher levels giving adverse effects on water or acid resistance.

The epoxide/tertiary amine activator can be supplemented by less than about 10 milliequivalents of preformed strong base per hundred grams of binder, with the strong base selected from the group consisting of salts of tetramethylguanidine, 1,8-diazabicylo(5.4.0)undec-7-ene, or quaternary ammonium hydroxide with carbonic, acetic or hydrofluoric acids and mixtures thereof to accelerate cure. The level of strong base should be kept to the minimum level giving the desired improvement in early cure, due to adverse effects on water resistance. The carbonic salts give the best improvement of early surface cure, and are therefore usually preferred. This is thought to be due to the ease of loss of acid from the film as carbon dioxide. However, even at 10 milliequivalents per hundred grams of binder, the carbonic salts tend to give loss of gloss, and thick films can even wrinkle due to surface cure exceeding sub-surface cure and solvent loss.

If the level is kept below about 5 milliequivalents of preformed strong base, the strong base can be added as hydroxide or free base rather than the salt while retaining useful, albeit shortened pot-life.

To minimize adverse effects on water resistance, it is preferred that the hydroxide or salts be selected from tetrabutylammonium, tetraethylammonium, and trimethylbenzylammonium. These are commercially available as methanolic or aqueous solutions, limiting packaging options to those in which the preformed base is kept separate from ester groups.

Improvement of early cure without the problems of preformed base can be accomplished by use of phenols, or combinations of phenols and alcohols. Without limiting the scope of the invention, it is believed that phenols and alcohols accelerate the reaction between tertiary amines and epoxides. Preferred phenols are alkylsubstituted, for example p(t-butyl)phenol and nonylphenol. Preferred levels of phenol are about 5 to about 30 milliequivalents per 100 grams total weight of activator plus Carbon Michael-reactive components. The alcohols are used at from 1 to 20 percent of the binder, with a preferred alcohol being 2-ethylhexanol.

Preferred active methylene moieties are esters or amides of acetoacetic acid, malonic acid, or cyanoacetic acid. Availability of acetoacetic esters or amides via reaction of alcohol or amine groups with diketene makes these moieties economically attractive. Malonic ester or amide moieties can be preferred for low color with certain alkenes. A particularly preferred route to use of malonate moieties is as a polyester made by reaction of malonic esters with glycols and other difunctional esters or acids. Cyanoacetic esters or amides can be preferred for high reactivity with low levels of active methylene functionality per molecule or with alkene components that have poor reactivity with acetoacetate or malonate moieties.

Acrylic polymers with pendant active methylene groups are preferred where it is desirable to have high levels of active methylene functionality per molecule and hard compositions with short tack-free times. For economy and ease of synthesis, it is preferred with acrylic polymers to use pendant acetoacetate groups, for example by use of allyl acetoacetate, acetoacetoxyethyl methacrylate, or acetoacetoxyethyl acrylate as monomers. Acetoacetoxyethyl methacrylate or acetoacetoxyethyl acrylate are favored for ease of copolymerization, especially when high levels of active methylene moiety are desired. The amount of acetoacetate-functional monomer is selected to give adequate crosslinking. Higher levels of acetoacetate-functional monomer are required as the molecular weight of the acrylic polymer is decreased and as the level of the acrylic polymer in the binder is decreased. Greater than about 15 percent acetoacetate-functional monomer is preferred for solvent resistant coatings, with up to about 60 percent being desirable for high solids coatings with low molecular weight acrylic polymers or binders having the acrylic polymer less than 40 percent of the total weight.

Acetoacetic, malonic, and cyanoacetic esters and amides of low molecular weight mono, di-, tri-, and higher functional alcohols and amines are preferred where it is desireable to have solventless ambient cure compositions, or as viscosity-reducing components with higher molecular weight methylene components. For low color, malonic esters are preferred.

The alkene component should have at least two alkene groups per molecule. Preferred alkene moieties for use with the above methylene components are alpha-beta unsaturated esters of acrylic acid, fumaric acid, mixtures of fumaric and maleic acid, and the Michael addition products of acrylic acid with 1–5 propionate units per double bond. Maleic esters are significantly less reactive than fumaric esters. Methacrylate esters are reactive enough only with cyanoacetic esters and amides.

For low color with acetoacetate as active methylene and over a broad range of ratios of alkene moiety to active methylene moiety, with molar ratio of alkene to methylene as low as 0.9, Michael addition products of acrylic acid are preferred as alpha-beta unsaturated acid. The simplest such Michael addition product is beta-acryloxypropionic acid. It is preferred to use the mixture of beta-acryloxypropionic acid and higher Michael addition products, with up to 5 propionate units per double bond, that result from reaction of acrylic acid in the presence of catalysts for the Oxygen Michael reaction. Without limiting the scope of the invention, it is believed that reversal of the Oxygen Michael reaction addition is triggered during Carbon-Michael cure when the active methylene content drops to a low level, allowing the binder to become more alkaline. The reversal of the Oxygen Michael reaction is believed to generate acid, preventing the film from becoming strongly alkaline, thus minimizing alkali-induced color formation. Although good color can be obtained with a variety of such esters, it is preferred for good hardness to use esters of a trifunctional alcohol such as trimethylolpropane, and with a molar ratio of alkene to active methylene in the range 0.9–2.0.

With acrylic acid as the alpha-beta unsaturated acid and acetoacetate as the methylene moiety, color develops with aging of the cured binder unless the ratio of alkene to methylene is greater than 1.5. When the alpha-beta unsaturated acrylic esters have three or more alkene groups per molecule, the ratio of alkene to active methylene can be as high as 4.0. When the alpha-beta unsaturated acrylic esters have only two alkene groups per molecule, the molar ratio of alkene to active methylene should be in the range 1.5–2.2.

With fumaric acid or mixtures of fumaric acid and maleic acid as alpha-beta unsaturated acid, preferred alkene components are polyesters with a number average molecular weight greater than about 500, an equivalent weight less than about 700 grams per alkene moiety, and less than about 0.2 equivalents of acid per 100 grams of polyester solids. Cure is poor outside of these ranges, and especially preferred for good cure are polyesters with number average molecular weight greater than about 900, equivalent weight less than about 500, and less than about 0.1 equivalents of acid per 100 grams. The hardest and most chemically resistant films are obtained with binders containing lower levels of polyester. For such films, it is preferred that the equivalent weight be less than about 300, with use of correspondingly low levels of dibasic acids other than maleic/fumaric. The least expensive and most flexible films are obtained with binders containing higher levels of polyester. For such films it is preferred to use a coacid selected as described below.

For hydrolysis resistance, durability and economy, the polyfunctional alcohols used are mixtures of neopentyl glycol, neopentyl glycol mono(hydroxypivalate) (ED204), 2,2,4-trimethyl-1,3-pentanediol, trimethylolpropane, and cyclohexane dimethanol. Especially preferred are mixtures of neopentyl glycol, trimethylolpropane, and neopentyl glycol mono(hydroxypivalate).

A high level of fumaric acid is preferred for reactivity with methylene groups, however due to ready crystallizability of fumarate polyesters of neopentyl glycol, the preferred ratio of fumaric/maleic is in the range from about 80/20 to 20/80. For the best reactivity, the ratio of fumaric/maleic should be above 40/60.

For outdoor durability, it is preferred that the dibasic acid moieties other than fumaric and maleic are cycloaliphatic or aliphatic. A particularly preferred coacid for hardness and durability is cyclohexane dicarboxylic acid.

For gloss and durability with methylene-functional acrylic polymers, it is critical that the acrylic polymer and the polyester form a homogeneous, single phase after evaporation of solvent. With neopentyl glycol as main glycol and maleic and fumaric acids as main diacids, preferred acrylic polymers have 30–50 percent by weight acetoacetoxyethyl methacrylate and greater than 30 percent by weight of butyl or isobutyl methacrylate. Such acrylic polymers are also compatible with polyesters having substantial levels of cyclohexane dicarboxylic acid together with maleic and fumaric acids. The film properties can be varied over a wide range while maintaining these limits by varying the ratio of the methylene-functional acrylic polyer to unsaturated polyester and the equivalent weight of the polyester. A given polyester can be used over a range of ratios, however it is preferred to have at least 1 alkene group per active methylene group for reactivity and less than about 3 alkene groups per active methylene groups for durability and early alkali resistance.

For the best water resistance it is preferred that the end-groups of the polyester are hydrophobic rather than hydrophilic alcohol groups. One preferred route to such polyesters is use of relatively high-boiling monofunctional alcohol in combination with glycols in reaction with dibasic acids. This can be done in steps, first preparing an acid-terminated polyester, then reducing the acid number to a low value by reaction with monofunctional alcohol. A preferred monofunctional alcohol is 2-ethylhexanol. A second preferred route is post-reaction of hydroxy-terminated polyester with acetic anhydride. A third preferred route is post-reaction of hydroxy-terminated polyester with hydrophobic isocyanate, with a preferred embodiment for good cure being isocyanates of hydroxyalkyl acrylates, which give acrylate-terminated polyesters following reaction with the hydroxy-terminated polyester. A fourth route is reaction of polyester with an excess of isocyanate, followed by addition of monofunctional alcohol. Again a preferred emmbodiment with this route is use of a hydroxyalkyl acrylate to give acrylate-terminated polyester. A fifth route to such polyesters is preparation from diesters and glycols by transesterification.

With hydroxyl-terminated polyesters, hardness and chemical resistance can be improved by adding multifunctional isocyanate at the time of mixing Carbon Michael-reactive components, tertiary amine and epoxide.

DETAILED DESCRIPTION OF THE INVENTION

The present invention relates to an improved method for activating Carbon Michael cure with combinations of Carbon Michael-reactive active methylene compounds and Carbon Michael-reactive alkene compounds preferred for reactivity, economy, low hazard and low color.

The invention also relates to coating or binder compositions including active methylene moieties, Michael-reactive alkene groups, epoxide groups, tertiary amines and supplementary additives for improvement of early cure.

The abbreviations used in the Examples are as follows:

| | |
|---|---|
| AAEM | Acetoacetoxyethyl methacrylate |
| BA | Butyl acrylate |
| bis-DMAPA | bis-Dimethylaminopropyl amine (tetramethyliminobispropylamine) |
| BMA | Butyl methacrylate |
| ButAc | Butyl acetate |

-continued

| | |
|---|---|
| Capr | Capryl alcohol |
| DBM | Dibutylmaleate |
| DBUACETATE | Diazabicycloundecene acetate |
| DBUCARB | Diazabicycloundecene carbonate |
| DMAEMA | Dimethylaminoethyl methacrylate |
| DMAM | Dimethylaminomethy1l-substituted phenol |
| DMAPA | Dimethylaminopropyl amine |
| DMAPMA | Dimethylaminopropyl methacrylamide |
| DMCD | Dimethyl ester of cyclohexane dicarboxylic acid |
| DMM | Dimethylmaleate |
| EthH | 2-Ethylhexanol |
| GMA | Glycidyl methacrylate |
| HEMA | Hydroxyethyl methacrylate |
| HOAC | Acetic Acid |
| IBMA | Isobutyl methacrylate |
| MAA | Methacrylic acid |
| MAnh | Maleic anhydride |
| meq | Milliequivalent |
| MMA | Methyl methacrylate |
| NPG | Neopentyl glycol |
| Sty | Styrene |
| TBACARB | Tetrabutylammonium bicarbonate |
| TBAH | Tetrabutylammonium hydroxide |
| TEDA | Triethylenediamine |
| TMGACETATE | Tetramethylguanidine acetate |
| TMGCARB | Tetramethylguanidine bicarbonate |
| TMPAcAc | Trimethylolpropane trisacetoacetate |
| TMPAOPATE | Trimethylolpropane tris(aopate), Mn = 570. |
| TMPMal | Trimethylolpropane tri(ethyl malonate) |
| TMPTA | Trimethylolpropane triacrylate |
| Xyl | Xylene |

EXAMPLE 1

Preparation of Polyester A, an Alkene-Containing Component Having a Low Fumarate/Maleate Ratio A 1000 ml. four-necked flask equipped with a thermometer, subsurface nitrogen ebullator, mechanical stirrer, 6' Vigreux column and strip condenser was charged with 360 g. dimethyl maleate (2.5 moles), 117 g. neopentyl glycol (1.125 moles), 148.5 g 2,2-Diethyl-1,3 propanediol (1.125 moles), 1.2 g. dibutyltin oxide and 0.1 g. phenothiazine. The resulting slurry was heated rapidly, under nitrogen, to 160 degrees C. to dissolve the diols and initiate the transesterification reaction. Methanol generated in the process was removed by fractional distillation through the Vigreux column. The mixture was kept 2 hours at 160 degree C. and then was heated gradually to 210 degrees C. over a period of 5–6 hours. Approximately 90% of the theoretical alcohol was collected. After a 1 hour hold, the resin was stripped of volatiles in vacuo (15 min., 30–40 mm.), allowing the temperature to decrease to 175–180 degrees C. The polyester was cooled to 140 degrees C. and then diluted with xylene to afford the finished product at 83.8% solids, viscosity 4800 cps. The fumarate/maleate ratio estimated from an NMR spectrum was 11/89. Gel permeation chromatography indicated that the molecular weights were Mw=2010 and Mn=1320.

EXAMPLE 2

Preparation of Polyester B, an Alkene-Containing Component having a High Fumarate/Maleate Ratio Polyester B was prepared from polyester A by isomerization with 0.7 wt. % di-n-butylamine, giving a fumarate/maleate ratio estimated by NMR of 90/10. The solids content was 84.6 percent, and the viscosity was 14,100 cps. Gel permeation chromatography indicated that the molecular weights of Polyester B were Mw=2390, Mn=1450.

EXAMPLE 3

Preparation of Acetoacetate Functional Polymer A, a Methylene-Containing Component Three hundred twenty (320) grams of reagent grade xylene solvent was weighed into a one liter four neck flask. A monomer mix was prepared from 96 grams methyl methacrylate, 96 grams butyl methacrylate, 96 grams styrene, 192 grams AAEM, and 7.2 grams of t-butyl peroctoate. A solution of n-dodecyl mercaptan was prepared by dissolving 12.1 grams of the mercaptan in enough of the solvent to make 60 ml of solution. The remaining solvent was stirred with a nitrogen sparge and heated to 105 degrees C. The monomer mix and mercaptan solution were then added simultaneously over a period of 95 minutes at 103–106 degrees C. Following completion of the additions the mixture was held at 105 degrees C. for another 150 minutes with 2 gram portions of t-butyl peroctoate being added after 45 and 95 minutes. The resulting 816 grams of solution was found to contain 60.9 wt. % polymer solids. Gel permeation chromatography indicated that the molecular weights were Mw=15,200, Mn=5560. The monomer ratio was 40 AAEM/20 MMA/20 BMA/20 Styrene. The initiator was 1.5% t-butyl peroctoate on polymer solids. The chain regulator was 2.5% n-dodecyl mercaptan on polymer solids.

EXAMPLE 4

Preparation of Acetoacetate Functional Polymer B, a Second Methylene-Containing Component Having a Lower Molecular Weight Polymer B was prepared by the same procedure used with Polymer A, except for use of 1.5% 2,2'-azobis(2-methylbutanenitrile) as the initiator in place of t-butyl peroctoate, and use of 5.0% n-dodecyl mercaptan in place of 2.5%. Gel permeation chromatography indicated that the molecular weights were Mw=8170, Mn=2720.

EXAMPLE 5

White Paints Demonstrating Pot Life/Cure and Gloss/Cure Problems with Tetrabutylammonium Hydroxide as Activator In this example, a preformed strong base activator component believed to be the best activator of the prior art, tetrabutylammonium hydroxide, was used. This example demonstrates fumarate gives unexpectedly superior results, even with an activator of the prior art. It also demonstrates the cure/gloss problem and demonstrates the pot life cure problem.

Pigment grinds were prepared using Titanium Dioxide as pigment with a high speed disperser, grinding the pigment in the acetoacetate functional polymers A and B. Eight and nineteen hundreths grams of pigment grind containing 3.75 grams pigment, 2.50 grams polymer solids, and 1.94 grams xylene were mixed with additional acetoacetate polymer (3.31 grams solids), 2.13 grams xylene, and alkene component. The alkene components used were Polyester A (Maleate), Polyester B (Fumarate), and TMPAOPATE (trimethylolpropane tris(acryloxypropionate, the ester of trimethylolpropane with acrylic acid Michael addition products, having three moles of alkene per 570 grams). The weight of alkene component solids in each case was 2.94 grams, giving close to 1.5 equivalents of alkene component per mole of AAEM in the acrylic. Since earlier work indicated that addition of butanol could lengthen pot life and improve gloss, the level of butanol was studied in addition to the level of catalyst, molecular weight of the AAEM polymer, and type of alkene component. The paints were completed by adding xylene or xylene and butanol to give 58–60 weight percent solids after catalyst addition and 0 or 25 weight percent butanol on binder solids, then finally adding 0.35, 0.52, or 0.78 grams of 31 wt. % tetrabutylammonium hydroxide in methanol, giving 4.8, 7.2 or 10.8 mmoles quaternary nitrogen/100 grams binder solids (1.25, 1.87, or 2.80 wt. % catalyst solids on binder solids).

The catalyst was added last, after obtaining a homogeneous mixture of the other components. Then the paint was mixed further for two minutes and drawn with a 4-mil gate on phosphatized cold rolled steel (Bonderite 1000 pretreated steel). Measurements were made of time to freedom from tack with a Zapon tack tester and a 500 gram weight, and of time to gelation of the remaining paint. Two panels were drawn with each paint. One panel was aged at ambient for two days, then held for three days in an oven at 140 degrees F., then two days at ambient. At this time the gloss (20 degree) and Knoop Hardness were measured. The other panels were aged under ambient conditions. At 28 days with the set of panels using Acetoacetate Functional Polymer A and at 26 days with the set of panels using Acetoacetate Functional Polymer B, the Knoop Hardness was measured and also the response of the film to a spot of xylene, which was placed on the film and allowed to evaporate. The spot was rated for blistering using the ASTM blister size and frequency standards and for degree of soluble material at the perimeter of the spot, on a scale from very slight (VSlight) to severe.

Results are tabulated in Table 1. At the lowest catalyst levels and with the least reactive (low molecular weight acrylic copolymer, maleate as alkene component) systems, the gloss and pot-life are promising, but the cure is poor. At the higher catalyst levels, cure improves, but gloss and pot-life are poor.

In contrast to the teaching of Brindopke et. al., fumarate polyesters give better cure than maleate polyesters.

TABLE 1

Demonstration of pot life/cure and gloss/cure problems with Example 5 activator and discovery of reactivity advantages for fumarate over maleate polyesters.

| Polyester | % Wt. Butanol | Amt. Cat. (meq/100 g) | Gel Time (mins.) | 500 gm. Zapon Tack (mins.) | Gloss (After Oven) | Hardness (After Oven) | Hardness (After 28 Days) | Xylene Spot (After 28 Days) |
|---|---|---|---|---|---|---|---|---|
| ACETOACETATE FUNCTIONAL POLYMER A (High Mol. Wt.) | | | | | | | | |
| A | 0 | 4.8 | 429–1372 | 191–234 | 81.0 | 1.7 | 0.8 | Severe |
| A | 0 | 7.2 | 306–329 | 228–232 | 73.0 | 3.0 | 1.4 | Mod/Sev |
| A | 0 | 10.8 | 241–277 | 176–221 | 67.6 | 5.6 | 1.9 | Moderate |
| A | 25 | 4.8 | 1347 | 167–214 | 79.5 | 1.7 | 1.0 | 9DBlist |
| A | 25 | 7.2 | 400–1340 | 160–210 | 57.6 | 2.8 | 1.3 | Severe |
| A | 25 | 10.8 | 389–1328 | 149–199 | 72.0 | 6.0 | 1.9 | Moderate |
| B | 0 | 4.8 | 54–80 | 133–184 | 61.0 | 9.2 | 2.8 | Moderate |
| B | 0 | 7.2 | 4–36 | 72–87 | 26.1 | 11.8 | 3.7 | Slt/Mod |
| B | 0 | 10.8 | 4–26 | 46–62 | 9.6 | 14.2 | 6.6 | VSlight |
| B | 25 | 4.8 | 135–153 | 99–114 | 67.0 | 9.0 | 2.9 | Mod/Sev |
| B | 25 | 7.2 | 53–65 | 57–74 | 55.1 | 13.4 | 5.7 | Moderate |
| B | 25 | 10.8 | 4–45 | <50 | 46.7 | 14.3 | 6.5 | Slight |
| TMPAOPATE | 25 | 4.8 | >1056 | >1054 | 81.0 | 2.4 | 2.2 | Moderate |
| TMPAOPATE | 25 | 7.2 | 102–1050 | 198–1048 | 61.8 | 6.7 | 4.5 | VSlight |
| TMPAOPATE | 25 | 10.8 | 67–82 | 46–60 | 52.1 | 10.7 | 5.3 | VSlight |
| ACETOACETATE FUNCTIONAL POLYMER B (High Mol. Wt.) | | | | | | | | |
| A | 0 | 4.8 | 470–4304 | 487–4320 | 80.2 | 0.8 | 0.6 | 9FBlist |
| A | 0 | 7.2 | 465–4298 | 481–4320 | 82.0 | 1.3 | 0.8 | 9MDBlist |
| A | 0 | 10.8 | 449–4281 | 286–335 | 71.9 | 1.9 | 1.0 | 9MBlist |
| A | 0 | 16.2 | >4274 | 4248–279 | 62.7 | 4.6 | 1.4 | Severe |
| A | 25 | 4.8 | >4274 | 451–4320 | 74.7 | 0.8 | 0.7 | 9FBlist |
| A | 25 | 7.2 | >4256 | 405–435 | 77.8 | 1.3 | 0.9 | 9MDBlist |
| A | 25 | 10.8 | >4251 | 302–335 | 62.5 | 2.0 | 1.0 | 9MBlist |
| A | 25 | 16.2 | >4242 | 211–245 | 73.5 | 5.0 | 1.6 | Severe |
| B | 0 | 4.8 | 85–89 | 329–352 | 71.3 | 4.6 | 1.9 | 9MBlist |
| B | 0 | 7.2 | 38–49 | 160–204 | 46.5 | 9.5 | 3.2 | Mod/Sev |
| B | 0 | 10.8 | 33–43 | 88–127 | 12.0 | 12.8 | 4.7 | Moderate |
| B | 25 | 4.8 | 199–4036 | 177–203 | 75.5 | 4.5 | 2.2 | 9MBlist |
| B | 25 | 7.2 | 92–95 | 170–193 | 65.4 | 8.7 | 3.8 | Mod/Sev |
| B | 25 | 10.8 | 51–56 | 140–164 | 63.6 | 12.1 | 5.1 | Moderate |
| TMPAOPATE | 25 | 4.8 | >4030 | 180–4320 | 67.8 | 1.3 | 1.3 | Moderate |
| TMPAOPATE | 25 | 7.2 | 144–3966 | 146–4320 | 37.9 | 3.7 | 3.1 | Slt/Mod |
| TMPAOPATE | 25 | 10.8 | 42–134 | 51–92 | 39.7 | 8.4 | 3.6 | VSlight |

EXAMPLE 6

AAEM Copolymers C, D and E (20 AAEM, Higher Molecular Weight)

AAEM copolymers were prepared as described above except no mercaptan was used, the initiator was 2.16 wt. % t-butyl peroctoate on monomers, and the monomer compositions were as follows:

AAEM copolymer C: 40 MMA/20 BA/20 Sty/20 AAEM

AAEM copolymer D: 35 MMA/20 BA/20 Sty/20 AAEM/5 DMAEMA

AAEM copolymer E: 38 MMA/20 BA/20 Sty/20 AAEM/1.5 DMAEMA/0.5 MAA.

Gel permeation chromatography indicated the following molecular weights: C–Mw=35,000, Mn=13,900; D–Mw=49,700, Mn=15,100; E–Mw=43,300, Mn=16,000.

EXAMPLE 7

Effect of Epoxy Resin on Cure of AAEM Copolymers C, D and E with TMPAOPA in White Paints Grinds of titanium dioxide were prepared in the AAEM copolymers using a high speed disperser as above. Weights of grinds giving 6.01 grams polymer solids and 3.10 pigment were mixed with 1.51 grams TMPAOPA. This weight ratio gave 1.5 moles of alkene per mole of acetoacetate. One and eighty-eight one hundredths grams of n-butanol and sufficient xylene were added to make the paints 60 wt. percent solids after addition of activating additives. One set of paints contained 0.61 grams of epoxy resin DER-732 (a trademark of Dow), a polyglycol diglycidyl ether (alkylene oxide glycol type) with 305–335 epoxy equivalents per gram. This level of epoxy resin gave a 1/1 equivalent ratio between epoxy and tertiary amine in the case where the copolymer contained 5% DMAEMA.

All paints contained 0.58% choline based on binder solids, giving 4.8 mmoles quaternary ammonium/100 grams of binder. This level had given marginal cure in earlier experiments without epoxy added. The choline was added last, with the epoxy added as the final component in the mixes made prior to adding the choline. Viscosities of the paints were measured 2 minutes after adding the choline, and the paints were then drawn on phosphatized cold rolled steel (Bonderite 1000) panels using a 4 mil gate. Results are shown in Table 2.

TABLE 2

Effect of combination of tertiary amine and epoxy on cure.

| Sample Number | 1 | 2 | 3 | 4 | 5 | 6 |
|---|---|---|---|---|---|---|
| Copolymer | A | B | C | A | B | C |
| DMFMA level in copolymer | None | 5% | 1.5% | None | 5% | 1.5% |
| MAA level in copolymer | None | None | 0.5% | None | None | 0.5% |
| Epoxy Resin Added | | Yes | | | No | |
| Viscosity at 2 minutes (cps) | 176 | 220 | 178 | 204 | 278 | 212 |
| Viscosity at 100 minutes | 334 | 254 | 178 | 204 | 320 | 224 |
| Viscosity at 300 minutes | Gel | 400 | 192 | Gel | 400 | 224 |
| Viscosity at 3 days | | Gel | 258 | | Gel | 258 |
| Minutes to pass 500 g Zapon Tack-Free | 265–281 | >433 | >433 | 75–83 | 164–189 | 280–299 |
| Film Properties after 13 days Ambient Cure | | | | | | |
| 20 Degree Gloss, Panel A | 77.1 | 83.8 | 83.9 | 70.5 | 82.3 | 86.0 |
| 20 Degree Gloss, Panel B | 78.5 | 84.5 | 84.2 | 72.2 | 82.9 | 86.5 |
| Knoop Hardness | 0.95 | 8.59 | 2.16 | 2.30 | 2.17 | 1.20 |
| Pencil Hardness | HB | 2H | F | F | F | HB |
| Pencil after 10 sec. MEK | <6B | 2H | <6B | <6B | <<6B | <<6B |
| Xylene Spot Attack | Severe | Slight | Mod. | Mod. | Mod. | Mod. |

(Mod. = Moderate)

Sample 2, combining 5% tertiary amine in the AAEM copolymer with a stoichiometric amount of added epoxy, has dramatically better film properties, combining good gloss and solvent resistance. In the absence of added epoxy, amine detracts from cure, and in the absence of amine in the copolymer epoxy detracts from cure.

EXAMPLE 8

Comparison of Epoxy Resins for Cure with No Added Strong Base

Clear enamels were prepared with an AAEM copolymer having composition 40 AAEM/15 MMA/20 BMA/20 Sty/5 DMAEMA and a polyester crosslinker prepared from (mole ratios):

3.0 Maleic Anhydride/2.0 Trimethylpentanediol/2.0 NeopentylGlycol.

The enamels were prepared at 51 wt. % solids with xylene as sole solvent.

Epoxy resins were added to give a 1/1 equivalent ratio between amine and epoxy. The weight ratio of AAEM copolymer solids/polyester solids was 668/332, giving 1.5 equivalent C=C/acetoacetate.

All of the enamels had extended pot life, gelling only after three or more days. Table 3 shows film hardness results.

TABLE 3

Hardness development with only epoxy/amine latent catalyst.

| Epoxy Identification | Chemical Composition | Knoop Hardness | | |
|---|---|---|---|---|
| | | 1 day | 8 day | 14 day |
| Araldite RD-1 | Butyl Glycidyl Ether | 0.32 | 0.69 | 0.82 |
| Araldite CY-179 | Cycloaliphatic Diepoxide | 0.38 | 0.52 | 0.59 |
| Araldite DY-025 | C-12/C-14 Alkyl Glycidyl Ether | tacky | 5.77 | 9.90 |
| Araldite DY-027 | C-8/C-10 Alkyl Glycidyl Ether | 0.36 | 3.28 | 7.06 |
| Araldite MY-720 | N-Tetraglycidylmethylenbis-benzenamine | 0.34 | 1.54 | 5.72 |
| Araldite Resin 500 | 4-Glycidyloxy-N,N-di-Glycidyl aniline | 0.32 | 5.20 | 9.65 |
| Araldite Resin 510 | Same as Resin 500 | 0.38 | 4.54 | 9.72 |
| Heloxy MK-116 | 2-Ethylhexyl Diglycidyl Ether | 0.36 | 4.38 | 9.24 |
| Heloxy WC-67 | 1,4-Butanediol Diglycidyl Ether | 0.32 | 9.54 | 12.55 |
| Heloxy WC-68 | Neopentylglycol Diglycidyl Ether | 0.33 | 9.18 | 11.85 |
| Heloxy MK-107 | Cyclohexyldimethanol Diglyc. Ether | 0.32 | 8.86 | 12.35 |
| Heloxy WC-69 | Resorcinol Diglycidyl Ether | 0.31 | 9.80 | 13.00 |
| Heloxy WC-84 | Aliphatic Polyol Di/Triglyc. Ether | tacky | 2.88 | 5.97 |
| Epon 828 | Bisphenol A Digylcidyl Ether | 0.39 | 9.82 | 14.40 |

With the exception of butyl glycidyl ether and the cycloaliphatic diepoxide, all of the epoxy-functional compounds gave good hardness development.

EXAMPLE 9

Cure with No Strong Base Added, Comparing Triethylenediamine with Dimethylaminomethyl-Substituted Phenol and Amine in the AAEM Copolymer, at Various Levels of Epoxy Resin Clear enamels were prepared using either an AAEM copolymer that did not have amine comonomer, with a composition 50 IBMA/10 Styrene/40 AAEM or a related composition containing dimethylaminopropyl methacrylamide (DMAPMA): 50 IBMA/5 Styrene/40 AAEM/5 DMAPMA. The crosslinker was a polyester prepared from (mole ratio) 5 diethyl fumarate/4 2-methyl, 2-propyl, 1,3-propanediol. Neopentyl diglycidyl ether was used as the epoxy. The enamels with the resin without amine were formulated with triethylenediamine (TEDA) or dimethylaminomethyl-substituted phenol (DMAM) at 21, 42 or 63 meq amine nitrogen per 100 grams of binder. The epoxy was added at various levels relative to the amine. The enamels were drawn on phosphatized cold-rolled steel (Bonderite 1000) with an applicator having a 4 mil gate one hour after mixing. Results are shown in Table 4.

TABLE 4

Evaluation of TEDA and DMAM as tertiary amine for latent catalyst system with epoxides.

| Amine | Amine Level (meq/100 grams) | Epoxy Level | Gel Time (Hrs) | 500 g Zapon (Minutes) | Knoop Hardness 1 day | Knoop Hardness 14 day | Pencil Hardness 14 day | Butyl Acetate Patch |
|---|---|---|---|---|---|---|---|---|
| Enamels using AAEM copolymer without copolymerized amine. | | | | | | | | |
| DMAM | 21 | 21 | >120 | 344–382 | 0.36 | 9.97 | F | <6B |
| DMAM | 42 | 42 | >120 | 514–1419 | 0.76 | 15.50 | H | <6B |
| DMAM | 63 | 63 | 98–120 | 521–1416 | 1.76 | 13.95 | H | HB |
| DMAM | 42 | 84 | 98–120 | 518–1409 | 1.20 | 13.1 | H | HB |
| DMAM | 42 | 126 | 76–98 | 514–1405 | 1.52 | 12.35 | H | HB |
| DMAM | 21 | 63 | >120 | 511–1406 | 0.58 | 11.10 | F | <6B |
| TEDA | 21 | 21 | 10–24 | 180–274 | 3.72 | 13.33 | F | No Film |
| TEDA | 42 | 42 | <5 | 172–270 | 5.52 | 12.75 | F | <6B |
| TEDA | 63 | 63 | <5 | 173–267 | 6.74 | 12.65 | H | B |
| TEDA | 42 | 84 | <5 | 312–348 | 3.49 | 13.27 | H | <6B |
| TEDA | 42 | 126 | <5 | 161–266 | 2.06 | 7.95 | F | <6B |
| TEDA | 21 | 63 | <5 | 408–456 | 1.99 | 8.36 | F | <6B |
| Enamel using AAEM copolymer with copolymerized amine. | | | | | | | | |
| DMAPMA | 21 | 21 | >120 | 404–452 | 0.33 | 11.43 | H | <6B |

TEDA was the only amine tested that gave an early cure comparable to added strong base.

The experiment suggests that for the best combination of pot life, early cure and ultimate properties a combination of TEDA with less rapidly reacting tertiary amines is preferred.

EXAMPLE 10

Experiment Comparing Combinations of Tertiary Amines

Enamels were prepared using a different pair of related AAEM copolymers with and without copolymerized amine:

AAEM resin A: 20 BMA/20 MMA/20 Styrene/40 AAEM.

AAEM resin B: 20 BMA/15 MMA/20 Styrene/40 AAEM/5 DMAEMA.

The crosslinker was a polyester made from (mole ratios): 7.35 Neopentyl Glycol/1.0 Isophthalic Acid/1.0 Terephthalic Acid/4.0 Maleic Anhydride//2.0 Diethyl Fumarate. The crosslinker was used at a level giving one equivalent of C=C/acetoacetate (a weight ratio of about 67.5/32.5 AAEM copolymer/polyester solids). Films were drawn with a number of combinations of amine components, with the epoxy level adjusted to give one epoxy equivalent/equivalent of amine nitrogen except in one case with tertiary amine in the polymer and no added amine. Films were drawn as in the above experiments. The epoxy was neopentyl diglycidyl ether. The results are shown in Table 5.

TABLE 5

Comparison of combinations of amine components with epoxy addition at 1 equivalent epoxy/tertiary amine.

| AAEM Resin | Amines and Quat. Added (Type/eqvs. per 100 gr.) | Epoxy eqvs. | Knoop Hardness 1 day | Knoop Hardness 7 day | Knoop Hardness 17 day | Pencil 17 day | Patch Test 17 day ButAc | Patch Test 17 day Xyl | Haze in Humid. |
|---|---|---|---|---|---|---|---|---|---|
| A | None | None | 0.3 | 1.0 | 1.4 | 3B | Soluble | Soluble | Heavy |
| A | TBACARB/5 | None | 1.2 | 2.7 | 3.5 | F | <6B | <6B | Slight |
| A | TEDA/10 | 10 | 0.9 | 5.6 | 6.7 | F | <6BWrnkl | <6B | Moder. |
| A | TEDA/20 | 20 | 2.3 | 8.0 | 8.6 | F | <6BBlstr | <6BBlstr | Moder |
| A | TEDA/10+ | 20 | 1.3 | 8.0 | 10.7 | F | <6B | <6B | Moder. |
| B | None | None | 0.5 | 1.1 | 1.6 | B | Soluble | Soluble | Heavy |
| B | TBACARB/5 | 20 | 1.2 | 7.8 | 11.9 | H | <6B | <6B | Moder. |
| B | TEDA/10 | 30 | 1.0 | 9.0 | 11.5 | F | <6B | <6B | None |
| B | TEDA/5 | 25 | 0.8 | 8.2 | 12.1 | F | <6B | 2B | None |

*AAEM Resin A without copolymerized amine, Resin B has 5% DMAEMA.
*TBACARB = Tetrabutylammonium bicarbonate.
(B) = Blistered
(W) = Wrinkled With the AAEM resin having no copolymerized amine, the combination of TEDA and DMAM gave better film properties at 17 days than TEDA alone at the same level of nitrogen.

The best properties were with the combination of copolymerized tertiary amine and TEDA.

EXAMPLE 11

Heat Aging of TEDA with AAEM Copolymer

In Column 4 (Examples 13 and 14) of U.S. Pat. No. 4,408,018, reference is made to loss of crosslinking activity on aging strong base catalysts with AAEM copolymer for 10 days at 140° F., a typical package stability test condition. It has been shown in the preceding examples that with triethylenediamine plus epoxy one can achieve speed of cure needed for ambient cure coatings and with combinations of triethylenediamine and other tertiary amines one can achieve this in combination with good pot life and film properties. A heat stability test was conducted to determine if the crosslinking activity was stable. The AAEM copolymer and crosslinker were: 50 IBMA/10 Styrene/40 AAEM and 5 Diethyl Fumarate/4 2-methyl, 2-propyl, 1,3-propanediol. Clear enamels with a 1/1 ratio of C=C/acetoacetate were used. Mixtures of TEDA and AAEM copolymer heat aged at 140° F. for 10 days were compared with freshly prepared mixtures by combination with crosslinker and epoxy and comparison of tack-free time and hardness development of films and viscosity progression of enamels. No loss of crosslinking activity was observed when TEDA was heat-aged with the AAEM copolymer at levels giving 21, 43, or 64 milliequivalents of nitrogen.

EXAMPLE 12

Preparation of Pigment Grinds for Deep-Tone Blue Paints

Pigment dispersions for the paints were prepared in AAEM copolymer solutions by a sand mill procedure, using the following ratio of materials: 180 grams AAEM copolymer solids/34.63 grams Phthalocyanine Blue pigment (BT-4170, DuPont)/85.37 grams titanium dioxide (Ti-Pure R-960, DuPont)/200 grams xylene. The AAEM copolymers were at about 60 percent solids in xylene, with additional xylene added as required (to give 200 grams), based on the exact solids of the copolymer.

EXAMPLE 13

Comparison in Blue Paints of Binder Based on Combination of AAEM/GMA/BMA and AAEM/DMAPMA/BMA Copolymers with TEDA with Binder Based on AAEM/MMA/BMA Copolymer and Tetrabutylammonium Carbonate, Using Fumarate Polyester as Alkene Component.

The AAEM copolymers were prepared without mercaptan chain transfer agent, with the following monomer compositions and molecular weights (Mw/Mn) indicated by gel permeation chromatography:

AAEM Copolymer F: 40 AAEM/20 GMA/40 BMA (Mw/Mn=16,700/6620)

AAEM Copolymer G: 40 AAEM/10 DMAPMA/50 BMA (Mw/Mn=10,600/4080)

AAEM Copolymer H: 40 AAEM/5 MMA/55 BMA (Mw/Mn=14,800/6550).

The polyester was prepared with the following mole ratios of components: 0.67 trimethylolpropane/4.51 neopentyl glycol/2 maleic anhydride/3 diethyl fumarate/2 dimethyl cyclohexanedicarboxylate. The molecular weights (Mw/Mn) indicated by gel permeation chromatography were 9250/1750. The ratio of fumaric to maleic indicated by NMR was 87/13.

The paints were prepared by mixing pigment grind, additional AAEM copolymer, polyester, xylene, and a silicone leveling aid (SF-1023, General Electric Co.) at 0.1 weight percent of binder solids to give a homogeneous mixture. Then TEDA or tetrabutyl ammonium bicarbonate was added. All paints were 54.5 weight percent solids when complete and contained 0.364 grams Phthalocyanine Blue and 0.897 grams titanium dioxide per 10 grams binder. The TEDA was added as a 15 percent solution in methyl ethyl ketone. The tetrabutyl ammonium bicarbonate was prepared by carbonation of tetrabutylammonium hydroxide in methanol, and was 19.4 weight percent in methanol (0.64 meq/gram solution by titration). The TEDA level was 20 meq/100 grams binder (1.1 weight percent). The tetrabutylammonium bicarbonate level was 7.5 meq/100 grams binder. The ratio of AAEM copolymer/polyester solids was 2/1, giving 1 mole of alkene/mole of acetoacetate. With the system using AAEM copolymers F and G, the weight ratio of F/G was 1/1.

Paints were drawn with a 4 mil gate on phosphatized steel panels (Bonderite 1000) and on glass panels. The paint with tetrabutylammonium bicarbonate gave a pale blue, indicating flocculation of pigment. The paint with TEDA gave the desired deep-tone blue.

Table 6 shows film properties after ambient aging: Knoop and Pencil Hardness, impact resistance and gloss measured with the steel panels and volumetric swell ratio in butyl acetate measured with film lifted from the glass panels. The swell ratio measurement was based on increase in length of a 3 cm piece of film on swelling with butyl acetate, and calculated as the cube of the swelled length divided by the original length.

TABLE 6

Blue paint comparison of activation by tetrabutylammonium bicarbonate and by epoxide/tertiary amine with polyester as alkene component.

| AAEM Copolymer | F/G (1/1) | H |
|---|---|---|
| Additive | TEDA | TBACARB |
| Blueness | Deep | Pale |
| Knoop Hardness at 1 day | 1.6 | 1.3 |
| Knoop Hardness at 4 days | 4.5 | 1.5 |
| Knoop Hardness at 14 days | 8.9 | 2.4 |
| Pencil Hardness at 1/4/14 days | B/F/H | B/B/B |
| Swell ratio at 4/14 days | 1.73/1.55 | 2.04/2.00 |
| Direct Impact (in-lb) at 14 days | 70–90 | 50–70 |
| 20 degree gloss at 14 days | 81.2 | 66.0 |

The activator system of the invention shows much better development of hardness and combines excellent mechanical properties and solvent resistance with excellent gloss, while the preformed strong base activator gives marginal hardness and solvent resistance and poor gloss. The preformed strong base also causes a pigment flocculation.

EXAMPLE 14

Comparison in Blue Paints of Binder Based on Combination of AAEM/GMA/BMA and AAEM/DMAPMA/BMA Copolymers with TEDA with Binder Based on AAEM/MMA/BMA Copolymer and Tetrabutylammonium Carbonate, Using TMPAOPA as Alkene Component The AAEM copolymers were F, G, and H described in Example 13. The paints were prepared as described in the Example 13, with the only difference being the ratio of AAEM polymer/alkene component, which was 745/255, again giving a 1/1 mole ratio of alkene groups to acetoacetate groups.

Table 7 shows film properties obtained as described in Example 13. The paint with tetrabutylammonium bicarbonate was pale like in the preceding example. The paint with TEDA was slightly less deep a blue than the corresponding paint with polyester.

TABLE 7

Blue paint comparison of activation by tetrabutylammonium bicarbonate and by epoxide/tertiary amine with TMPAOPA as alkene component.

| AAEM Copolymer | F/G (1/1) | H |
|---|---|---|
| Additive | TEDA | TBACARB |
| Blueness | Nearly Deep | Pale |
| Knoop Hardness at 1 day | 4.1 | 1.3 |
| " 4 days | 7.2 | 1.8 |
| " 14 days | 10.0 | 2.7 |
| Pencil Hardness at 1/4/14 days | F/F/H | F/HB/HB |
| Swell ratio at 4/14 days | 1.41/1.34 | 1.58/1.54 |
| Direct Impact (in-lb) at 14 days | 70–90 | >130 |
| 20 degree gloss at 14 days | 82.9 | 79.1 |

The properties with tetrabutylammonium bicarbonate activator were better with TMPAOPA as alkene component than with polyester (Example 13), but the activator system of the invention again shows superiority in hardness development, solvent resistance, gloss and color.

EXAMPLE 15

Preparation of Ethylhexyl Terminated Polyester C

A 1000 ml. four-necked flask equipped with thermometer, nitrogen sparge tube, overhead mechanical stirrer and Barrett trap above a six inch Vigreux column was charged with 44.3 g. trimethylolpropane (0.33 mol), 103.1 g. neopentyl glycol (0.99 mol), 194.2 g. maleic anhydride (1.98 mol) and 0.9 g. triphenyl phosphite. The resulting mixture was stirred with a nitrogen sparge and heated to approximately 130° C. At this point all of the solids melted and an exothermic reaction rapidly increased the temperature of the mixture to 180° C. Xylene was added through the condenser until the solution refluxed vigorously at a pot temperature of 180° C. Refluxing at that temperature was continued for two hours during which 18 ml. of aqueous distillate was collected in the Barrett trap. The mixture was then allowed to stand at room temperature overnight. The following day 130.2 g. 2-ethyl-1-hexanol (1.00 mol) and 1.8 g. dibutyltin oxide were added. The mixture was reheated, again under nitrogen, and refluxed at 190° C. for an additional 8 hours during which time approximately 16.5 ml. of water was collected in the trap. The course of the reaction was followed by periodically removing samples of the reaction mixture and titrating them with base to determine the amount of unesterified acid remaining. At the end of the reaction, the acid titer was 0.027 meq/g. of the 88.5% solids solution. Proton NMR showed the polyester had a 71 fumarate to 29 maleate mol ratio of isomers. Molecular weight as determined by GPC was Mw=12,300, Mn=1250.

EXAMPLE 16

Preparation of Hydroxyl Terminated Polyester D

A 1000 ml. four-necked flask equipped with a thermometer, nitrogen sparge tube, overhead stirrer and Barrett trap on top of a six inch steam jacketed Vigreux condenser was charged with 445.8 g. neopentyl glycol (4.3 mols), 228.3 g. dimethyl cyclohexane-1,4-dicarboxylate, 1.6 g. dibutyltin oxide and 1.6 g. triphenyl phosphite. Steam was turned on in the jacketed Vigreux, and the mixture was stirred with a nitrogen sparge and heated to 190° C. After one hour, the temperature was increased to 200° C. and held there for a total of 4.5 hours during which time 95% of the theoretical weight of distillate was collected. Actual weight loss, as determined by weighing the reaction mixture after allowing it to cool to room temperature, was 76.3 g. or 104.5% of the theoretical amount. There was then added 268.7 g. maleic anhydride (2.7 mols) and the mixture was reheated again under nitrogen but without steam in the jacketed Vigreux. Enough xylene was added through the condenser on top of the Barrett trap to cause steady reflux at a pot temperature of 200° C. Refluxing was continued at that temperature for a total of 7 hours during which 58 ml. of aqueous distillate was collected and the acid titer of the mixture dropped to 0.022 meq per gram of reaction mixture. The product was then diluted to approximately 70% solids by adding xylene until the mixture refluxed at a pot temperature of 160° C. Proton NMR of the polyester showed an isomer mol ratio of 58 fumarate to 42 maleate. Molecular weight as determined by GPC was Mw=7340, Mn=2330.

EXAMPLE 17

Preparation of Aminated Polyesters from Polyester D

Polyester E.

A 1000 ml. three-necked flask fitted with overhead stirrer and nitrogen sparge tube was charged with 480 g. of Polyester D which was stirred at room temperature in a nitrogen atmosphere while 17.3 g. 3-(dimethylamino)propyl amine was added. A mildly exothermic reaction occurred and a pale yellow color developed. Proton NMR showed the product to have an isomer mol ratio of 87 fumarate to 13 maleate.

Polyester F.

A 500 ml. three-necked flask fitted with overhead stirrer and nitrogen sparge tube was charged with 240 g. of Polyester D which was stirred at room temperature in a nitrogen atmosphere while 7.9 g. of bis((3-dimethylamino) propyl amine) was added. A pale yellow color developed. Proton NMR showed the product to have an isomer mol ratio of 65 fumarate to 35 maleate.

Polyester G.

A 300 ml. three-necked flask fitted with overhead stirrer and nitrogen sparge tube was charged with 102.3 g. of Polyester D. The polyester was stirred under nitrogen and heated to 100° C. and 3.4 g. of bis((3-dimethylamino)-propyl amine was added. After a ten minute hold at 100° C. the mixture was allowed to cool to room temperature. This product was slightly darker in color than Polyesters E and F. Proton NMR showed an isomer mol ratio of 76 fumarate to 24 maleate.

EXAMPLE 18

Preparation of Trimethylolpropane Tris (acetoacetate)

A 1000 ml. four-necked flask fitted with overhead stirrer, nitrogen sparge tube, thermometer and Barrett trap on top of a 6" steam jacketed Vigreux column was charged with 134.2 g. trimethylolpropane (1.0 mol), 580.6 g. methyl acetoacetate (5.0 mols), 0.8 g. triphenyl phosphite and 0.8 g. dibutyltin oxide. Steam was turned on in the jacketed Vigreux and the mixture was stirred with a nitrogen sparge and heated. When the pot temperature reached 142° C. methanol began distilling rapidly from the mixture. Heating was continued for a total of 50 minutes to a maximum pot temperature of 185° C. Vacuum was then applied and the excess methyl acetoacetate was removed first at 20 mm. Hg then at 1 mm. Hg with a maximum pot temperature of 180° C. Yield of orange liquid product was 372.4 g., 96% of theory. A small amount of white solid formed in the sides of the flask after cooling to room temperature. This was removed by gravity filtration. Proton NMR showed 100% conversion based on integration of methylene adjacent to esterified oxygen relative to methyl of trimethylolpropane.

EXAMPLE 19

Preparation of Trimethylolpropane Tris (ethylmalonate)

A 1000 ml. four-necked flask fitted with thermometer, nitrogen sparge tube and a 6" steam jacketed Vigreux with a Barrett trap on top was charged with 134.2 g. trimethylolpropane (1.0 mol), 800.0 g. diethyl malonate (5.0 mols), 1.0 g. triphenyl phosphite and 1.0 g. dibutyltin oxide. Steam was turned on in the condenser and heating was begun with a nitrogen sparge. The mixture cleared but became cloudy again at approximately 130° C. When the pot temperature reached 160° C. ethanol began distilling from the mixture. Heating was continued for a total of 50 minutes with a maximum pot temperature of 180° C. Vacuum was then applied and excess diethyl malonate was removed. Temperature was allowed to fall rapidly to 100° C. to avoid crossesterification reactions which could yield high molecular weight materials. Final stripping was at 100° C. with 1 mm. Hg. Yield of product was 412 g. (86% of theory). Proton NMR was consistent with the proposed structure.

EXAMPLE 20

Direct Comparison of Epoxy/Amine and Preformed Strong Base Activators Using the Same AAEM Copolymer with Both Activators, and Demonstration of Advantages in Water Resistance with TEDA when the Epoxy Component is an AAEM/GMA Copolymer Rather than a Low Molecular Weight Epoxide Blue paints were prepared as described above, using the following AAEM copolymers:

AAEM Copolymer I: 40 AAEM/50 IBMA/10 DMAEMA

AAEM Copolymer J: 40 AAEM/40 IBMA/20 GMA.

The alkene component was Polyester H, a hydroxy terminated polyester prepared similarly to Polyester D. The mole ratio of reactants used to make the polyester was 20.4 neopentyl glycol/9.7 dimethyl cyclohexanedicarboxylate/9.7 maleic anhydride. The equivalent weight was 435 grams/alkene group. Gel permeation chromatograph indicated Mw=7700, Mn=2770.

The ratio of AAEM copolymer to polyester was 40/60, giving more economical but softer binders than illustrated in preceding examples. The comparison of preformed strong base and epoxy/amine activation was with AAEM copolymer I. The epoxy was a commercial example of bisphenol A diglycidyl ether (Epon 828, Shell). The latter epoxy/amine system was to be further compared with a system where the epoxy was from AAEM copolymer J, which was used at a 1/1 ratio with copolymer I (both then at 20 percent of total binder).

The strong bases were tetrabutylammonium bicarbonate and tetramethylguanidine bicarbonate, both prepared by carbonation of methanolic solutions. The tetrabutylammonium bicarbonate solution introduced more methanol into the paint, so the tetramethylguanidine was evaluated both with the minimum methanol and also with additional methanol added to give the same level as with tetrabutylammonium.

To test early cure and water resistance, pieces of the panels were exposed in a Cleveland Condensing (QCT) cabinet with the paint exposed to water vapor at 120 degrees F. and the backside of the panel exposed to ambient conditions. Table 8 gives hardness results. Table 9 gives gloss before and after exposure in the Cleveland Condensing cabinet, and rating of blisters developed during exposure. The exposure in the cabinet started after 1 day of ambient cure and lasted for 3 days. The level of methanol (MeOH) shown is weight percent of binder.

TABLE 8

Hardness comparisons for Example 20.

| AAEM Polymer | MeOH (Wt %) | Epoxy | Additive Type | Meq/100 g | Knoop Hardness 1/4/7 days | Pencil 1/4/7/14 days |
|---|---|---|---|---|---|---|
| J/I | 0 | GMA in I | TEDA | 28 | 0.5/1.3/1.9 | 5B/B/B/HB |
| J | 1.7 | None | TMGCARB | 10 | 0.5/0.8/0.8 | 3B/B/B/B |
| J | 2.6 | None | TMGCARB | 15 | 0.6/0.8/0.8 | 3B/B/B/B |
| J | 0 | 6pctEpon | TEDA | 28 | 0.5/2.6/4.0 | 3B/B/B/F |
| J | 10.0 | None | TBACARB | 10 | 0.4/0.6/0.6 | 5B/2B/B/B |
| J | 15.0 | None | TBACARB | 15 | 0.5/0.6/0.7 | 3B/B/B/B |
| J | 10.0 | None | TMGCARB | 10 | 0.4/0.7/0.7 | 3B/B/B/B |
| J | 15.0 | None | TMGCARB | 15 | 0.6/0.8/0.8 | 3B/B/B/B |

TABLE 9

Condensing cabinet results for Example 20.

| AAEM Polymer | MeOH | Epoxy | Additive Type | Meq/100 g | 20 Degree Gloss Before | After | Blisters Size | Density (ASTM) |
|---|---|---|---|---|---|---|---|---|
| J/I | 0 | GMA in I | TEDA | 28 | 80.2 | 75.8 | Micro | MD |
| J | 1.7 | None | TMGCARB | 10 | 57.5 | 9.6 | 7 | D |
| J | 2.6 | None | TMGCARB | 15 | 53.7 | 11.3 | 3–5 | D |
| J | 0 | 6pctEpon | TEDA | 28 | 81.3 | 9.5 | 7 | D |
| J | 10.0 | None | TBACARB | 10 | 73.8 | 68.0 | Micro | D |
| J | 15.0 | None | TBACARB | 15 | 65.9 | 56.4 | Micro | D |
| J | 10.0 | None | TMGCARB | 10 | 70.7 | 9.3 | 5–7 | D |
| J | 15.0 | None | TMGCARB | 15 | 66.8 | 13.9 | 3–5 | D |

MD = medium dense  D = dense

The hardness development was much better with amine/epoxy catalyst than with preformed strong base. The best gloss retention and blister resistance in the Cleveland Condensing Cabinet was with the system of the invention using GMA in an AAEM copolymer as epoxy. Methanol contributes to gloss with strong base activator, but gloss is still poor. Tetramethylguanidine gives very poor water resistance, with extremely severe blistering. Blistering is less severe, but still very bad when TEDA is used with low molecular weight epoxy resin. It is thought that blister resistance is related to low molecular weight water sensitive moieties that are osmotically active. High molecular weight water sensitive materials provide much less osmotic driving force for accumulation of water under the film.

EXAMPLE 21

Blue Paint Evaluation of Strong Base Activators for Blister Resistance with an AAEM Copolymer not Containing Amine to Show Blistering is a Problem in the Prior Art even without Amine Paints were prepared and tested as in the preceding example, except that the AAEM polymer composition was 40 AAEM/55 IBMA/5 Styrene. This was done to see if the strong base catalysts were more water resistant in a polymer without amine. Table 10 shows the results.

tem that does not have amine, further distinguishing preferred epoxy/amine activator systems from activators taught by Brindkopke et. al.

EXAMPLE 22

Blue Paint Comparison of a Polyester Similar to that Used in Example 20 with Amine Modified, Acrylate Modified, and Higher Fumarate Variants Polyester I was prepared by the same procedure and with the same raw materials as Polyester H of Example 20. The molecular weights indicated by GLC were Mw=9940, Mn=2820. Polyester J was prepared by addition, at room temperature, of DMAPA to Polyester I in the ratio of of 1 mole of DMAPA per 20.4 NPG. Polyester K was prepared by reaction of Polyester I with 2 moles of the adduct between isophorone diisocyanate and hydroxyethyl acrylate per 20.4 NPG. The molecular weights were Mw=9310, Mn=1790.

Polyester L was prepared similarly to Polyester I except that 4.85 moles of fumaric acid and 4.85 moles of maleic anhydride were used instead of 9.7 moles maleic anhydride. The percent of the unsaturation present in the isomerized (fumarate) form in the final polyesters was 53 for Polyester I and 75 for Polyester L. GPC of polyester L indicated Mw=13,400, Mn=3720.

TABLE 10

Evaluations of strong base catalysts with 40/60 AAEM copolymer/polyester binder using AAEM polymer composition 40 AAEM/55 IBMA/5 Styrene.

| Base | MeOH (wt %) | Meq/100 g | Knoop Hardness 1/7/14 day | Pencil 1/7/14 day | Gloss In | Gloss Out | Blister Size | Density |
|---|---|---|---|---|---|---|---|---|
| TBACARB | 10 | 10 | 0.5/0.9/1.8 | 5B/B/B | 72 | 61 | Micro | D |
| TMGCARB | 10 | 10 | 0.6/0.9/1.6 | 2B/B/B | 68 | 9 | 3–5 | D |
| TMGACETATE | 2.6 | 15 | -/0.7/0.9 | -/<6B/6B | Tacky at 1 day. | | | |
| DBUCARB | 2.2 | 10 | 0.4/1.0/1.4 | 4B/B/B | 73 | 10 | 9 | D |
| DBUCARB | 3.3 | 15 | 0.5/1.1/1.3 | 3B/B/B | 67 | 12 | 7–9 | D |
| DBUAcetate | 3.3 | 15 | -/0.7/1.4 | -/6B/5B | Tacky at 1 day. | | | |

D = dense

As shown by the gloss and blister results, the organic base activators TMG and DBU give poorer water resistance than tetrabutylammonium hydroxide, even with a polymer sys- Pigment dispersions prepared as described above were combined with additional AAEM copolymer, xylene, a silicone flow aid (SF-1023, General Electric), triethylenediamine as a solution in methyl ethyl ketone (MEK) and polyester to give paints with the following composition:

| | |
|---|---|
| Total AAEM copolymer solids | 4.0 grams |
| Polyester solids | 6.0 grams |
| 15 wt. percent DABCO in MEK | 0.8 grams |
| SF-1023 | 0.01 grams |
| Xylene | 10.0 grams |
| Phthalocyanine Blue | 0.364 grams |
| Titanium Dioxide | 0.897 grams |

The paints were drawn with a block having a 7 mil gate on cold rolled steel panels (Phosphate pretreated using Bonderite 1000 (Parker) pretreatment).

The compositions of the AAEM copolymers used were:

Copolymer J: 40 AAEM/50 i-BMA/10 DMAEMA. (Mw/Mn=15,600/5900)
Copolymer I: 40 AAEM/40 i-BMA/20 GMA. (Mw/Mn=14,600/7390)
Copolymer K: 40 AAEM/50 n-BMA/10 GMA. (Mw/Mn=19,600/8880).

In one set of comparison paints the AAEM copolymer solids were a 1/1 blend by weight of I and J. In another set of comparison paints the AAEM copolymer solids were all from K. Tables 11 and 12 show key results from evaluation of the films.

TABLE 11

Comparison of unmodified and amine or acrylate modified polyesters using AAEM Copolymers I and J.

| Polyester Identification | I | L | K | J |
|---|---|---|---|---|
| Polyester Modification | None | None | Acrylate | Amine |
| Fumarate/Maleate ratio | 53 | 75 | about 53 | >75 |
| | 47 | 25 | about 47 | <25 |
| Knoop Hardness at Days of Ambient Cure: | | | | |
| 1 day | 0.4 | 0.5 | 0.6 | 0.4 |
| 3 days | 0.8 | 1.0 | 1.2 | 1.5 |
| 7 days | 1.3 | 1.5 | 2.0 | 2.3 |
| 18 days | 2.6 | 2.6 | 2.8 | 3.4 |
| Percent of original gloss retained for 1 day ambient aged film exposed to high humidity in QCT chamber: | 88 | 88 | 94 | 93 |
| Blistering in QCT chamber: | 9MD | 9MD | 9M | 9MD |

TABLE 12

Comparison of unmodified and amine or acrylate modified polyesters using AAEM Copolymers K.

| Polyester Identification | I | L | K | J |
|---|---|---|---|---|
| Polyester Modification | None | None | Acrylate | Amine |
| Fumarate/Maleate ratio | 53 | 75 | about 53 | >75 |
| | 47 | 25 | about 47 | <25 |
| Knoop Hardness at Days of Ambient Cure: | | | | |
| 1 day | 0.4 | 0.5 | 0.5 | 0.5 |
| 3 days | 0.7 | 0.8 | 1.0 | 1.3 |
| 7 days | 1.0 | 1.0 | 1.4 | 1.8 |
| 18 days | 1.4 | 1.4 | 1.9 | 3.0 |

TABLE 12-continued

Comparison of unmodified and amine or acrylate modified polyesters using AAEM Copolymers K.

| Polyester Identification | I | L | K | J |
|---|---|---|---|---|
| Percent of original gloss retained for 1 day ambient aged film exposed to high humidity in QCT chamber: | 62 | 76 | 91 | 92 |
| Blistering in QCT chamber: | 9M | 9M | 9M | 9D |

Note the superior cure of the amine-modified polyester indicated by improved hardness and the improved gloss retention of the acrylate and amine modified polyesters in the critical test for humidity resistance at one day of ambient cure.

EXAMPLE 23

Blue Paint Comparison of Polyesters Modified Using Increasing Levels of DMAPA, Study of Effect of Epoxy Level with Modified Polyesters A polyester (Polyester M) with the same composition as the Example 22 but with lower molecular weight (Mw=3730, Mn=1930) was reacted with DMAPA using 1, 2, 3, or 4 moles of DMAPA per 20.4 moles of NPG (polyesters N, O, P, and Q.)

A pigment dispersion was prepared as described in Example 22, using an AAEM copolymer with composition 40 AAEM/55 IBMA/5 Styrene. This dispersion was used with the same AAEM copolymer to make paints with the following composition:

| | |
|---|---|
| Total AAEM copolymer solids | 3.4 grams |
| Polyester solids | 6.0 grams |
| Epon 828 | 0.6 or 0.9 grams |
| SF-1023 | 0.01 grams |
| Xylene | 10.0 grams |
| Phthalocyanine Blue | 0.364 grams |
| Titanium Dioxide | 0.897 grams |

The paints were drawn with a block having a 7 mil gate on cold rolled steel panels (Phosphate pretreated using Bonderite 1000 (Parker) pretreatment).

Tables 13 and 14 show key results from evaluation of the films. Note the improved cure as measured by hardness and resistance to humidity at one day going from one to two moles of DMAPA/average polyester molecule, and the loss in acid resistance going from two to three moles of DMAPA/average molecule. Note that with the higher levels of amine the cure improves with the higher level of epoxy resin.

TABLE 13

Comparison of polyesters using binder composition AAEM polymer/Epon 828/Polyester = 34/6/60.

| Polyester Identification | N | O | P | Q |
|---|---|---|---|---|
| Moles DMPA/20.4 NPG | 1 | 2 | 3 | 4 |
| Knoop Hardness at Days of Ambient Cure: | | | | |
| 1 day | 0.8 | 1.3 | 1.7 | 1.8 |
| 3 days | 1.4 | 2.7 | 4.7 | 3.0 |
| 14 days | 1.7 | 2.8 | 3.4 | 1.7 |

TABLE 13-continued

Comparison of polyesters using binder composition AAEM polymer/Epon 828/Polyester = 34/6/60.

| Polyester Identification | N | O | P | Q |
|---|---|---|---|---|
| Gloss after QCT exposure of film exposed at 1 day ambient cure: | 37 | 71 | 62 | 49 |
| Pencil hardness of wet film from QCT test: | 6B | 5B | 5B | <6B |
| Pencil Hardness at Days of Ambient Cure: | | | | |
| 1 day | 6B | B | HB | HB |
| 3 days | 2B | B | HB | HB |
| 14 days | B | HB | HB | B |
| Pencil hardness after 30 minute patch test with 10% aqueous acetic acid (14 days cure): | 2B | 5B | <6B | <6B |

TABLE 14

Comparison of polyesters using binder composition AAEM polymer/Epon 828/Polyester = 33/8.7/58.3.

| Polyester Identification | O | P | Q |
|---|---|---|---|
| Moles DMAPA/20.4 NPG | 2 | 3 | 4 |
| Knoop Hardness at Days of Ambient Cure Shown: | | | |
| 1 day | 1.4 | 2.1 | 2.5 |
| 3 days | 2.6 | 7.3 | 8.5 |
| 17 days | 3.6 | 5.1 | 4.6 |
| Gloss after QCT exposure of film exposed at 1 day ambient cure: | 73 | 36 | 52 |
| Pencil hardness of wet film from QCT test: | 5B | 5B | 6B |
| Pencil Hardness at Days of Ambient Cure: | | | |
| 1 day | B | HB | HB |
| 3 days | B | HB | HB |
| 14 days | HB | HB | HB |
| Pencil hardness after 30 minute patch test with 10% aqueous acetic acid (14 days cure): | 5B | <6B | <6B |

EXAMPLE 24

Accelerating Effect of Phenols and Alcohols

Blue paints were prepared as described in Example 23, using the same AAEM copolymer and the 0.6 gram level of Epon 828 (binder composition AAEM copolymer/Epon 828/Polyester=34/6/60). The polyester was a repeat preparation of Polyester E (tertiary amine groups from bis-dimethylamino propylamine), with fumarate/maleate ratio by NMR=69/31 and molecular weights estimated by gel permeation chromatography of Mw=9370, Mn=2900. One paint was prepared without additional additives, the other paints with 4 weight percent para-t-butyl phenol based on binder solids, with or without use of 2-ethylhexanol or capryl alcohol at 20 weight percent on binder solids and with or without 0.4 weight percent TEDA based on binder solids.

Table 15 shows cure and viscosity progression for blue paints with or without p-t-butylphenol and the effect of using TEDA and/or octyl alcohols (2-ethylhexyl or capryl) with the phenol. 2-Ethylhexanol shortened the time to pass water spotting, but also shortened pot life and increased paint viscosity. It is clear that the phenol gave a dramatic improvement in time to pass water spot. With 4 wt. pct. phenol, 0.4 wt. pct. TEDA gave some further improvement in cure speed, while shortening pot-life but still allowing 6.5 hours to doubling of viscosity with this paint. A further benefit with 2-ethylhexanol seen here was improved resistance to blistering in high humidity.

TABLE 15

Effects of phenol, octyl alcohol and TEDA on cure of blue paints.

| Sample | 1 | 2 | 3 | 4 | 5 | 6 |
|---|---|---|---|---|---|---|
| Alcohol | None | EthH | Capr | None | None | EthH |
| Butylphenol | None | 4pct | 4pct | 4pct | 4pct | 4pct |
| TEDA | None | None | None | None | .4pct | .4pct |
| Early Cure Properties | | | | | | |
| Viscosity | | | | | | |
| 10 minutes | 62 | 124 | 114 | 72 | 74 | 114 |
| 150 minutes | 56 | 116 | 116 | 68 | 76 | 130 |
| 330 minutes | 58 | 140 | 136 | 76 | 146 | >1000 |
| Tack Free (Hr) | | | | | | |
| Zero Gram | 5–6 | 6–6.5 | 4–5.5 | 4–5.5 | 3–4 | 3–4 |
| 500 Gram | 8–9 | 7–7.5 | 8–9 | 6–7.5 | 6–7 | 6–7 |
| Water Spot Pass (Hr) | 12–19 | 4–5 | 5–7 | 5–7 | 4–5 | 3–4 |
| Film Properties (13 days ambient cure) | | | | | | |
| Knoop Hardness | 5.1 | 2.8 | 2.2 | 3.0 | 3.6 | 2.1 |
| Pencil Hardness | HB | B | B | HB | HB | B |
| Blister after 4 Days High Humidity | Mod. Micro | None | Few Micro | Mod. Micro | Dense Micro | None |

EXAMPLE 25

Effect of Polyester Type on Cure and Water Resistance with Use of a Mixture of TEDA and Bis-DMAPA as Amines Pigment dispersions were prepared with titanium dioxide as sole pigment, using a sand grind procedure with AAEM copolymers as vehicle. The AAEM copolymers were prepared without mercaptan, using t-butyl peroctoate as initiator with 4.5 or 9.0 weight percent t-butyl peroctoate based on monomers. The monomer composition was 40 AAEM/52 i-BMA/8 GMA. AAEM copolymer L, prepared with 9.0 percent t-butyl peroctoate, had Mw=9,960, Mn=2760. AAEM copolymer M, prepared with 4.5 percent t-butyl peroctoate, had Mw=20,700, Mn=6910.

Paints were prepared with 4.29 grams titanium dioxide and 10 grams of binder, with the binder solids being AAEM Polymer/Polyester/TEDA/bis-DMAPA/p-t-butyl phenol= 56/40/0.5/1.5/2. The polyesters were:

Polyester C Repeat (ethyl hexyl terminated, Mw/Mn=12, 300/1250, Fumarate/Maleate=71/29).

Polyester R: 8.7 NPG/2 ED204/9.7 MAnh, 9710/1800, 52/48, hydroxyl terminated.

Polyester S: 6.7 NPG/1.42 ED204/7.12 MAnh, 6730/ 2290, 55/45, hydroxyl terminated.

Polyester T: 4.44 NPG/1.11 ED204/4.55 MAnh, 4390/ 1760, 52/48, hydroxyl terminated.

Polyester U: 4.44 NPG/1.11 ED204/6.55 DBM, 2500/ 1270, 23/77, butyl terminated.

Polyester V: 4.44 NPG/1.11 ED204/6.55 DMM, 1810/ 1110, 12/88, methyl terminated.

Polyester W: 4.44 NPG/1.11 ED204/4.55 MAnh//2.0 Acetic Anhydride, 3560/1740, 46/54, acetate terminated.

The paints were drawn with a 7 mil gate on phosphatized rolled steel (Bonderite 1000) and properties determined scribed in Tables 16 and 17.

TABLE 16

Viscosity progression, water spot test for early cure, and 14 day ambient cure hardness as a function of AAEM polymer molecular weight and polyester type.

| SAM-PLE | AAEM POLY-MER | POLY-ESTER | VISC 12 MN | VISC 8 HR | WATER SPOT | KHN 14 DA | PNCL 14 DA |
|---|---|---|---|---|---|---|---|
| 1 | L | R | 162 | 274 | 8 | 5.2 | HB |
| 2 | L | C | 106 | 356 | >9Sldull | 4.1 | HB |
| 3 | M | C | 156 | 266 | >9Sldull | 5.3 | HB |
| 4 | M | S | 190 | 414 | 7–8 | 5.5 | HB |
| 5 | M | T | 156 | 264 | 9+ | 7.3 | HB |
| 6 | M | U | 106 | 166 | >9(Ring) | 2.7 | B |
| 7 | M | V | 102 | 154 | >9(Ring) | 2.6 | B |
| 8 | M | W | 128 | 200 | >9Sldull | 4.0 | HB |

TABLE 17

Effect of AAEM polymer molecular weight and polyester type on humidity resistance.

| | | | 1 DAY AMBIENT CURE | | | 11 DAY AMBIENT CURE | | |
| | | | | 20° GLOSS | BLISTER | | 20° GLOSS | BLISTER |
| SAMPLE | AAEM POLYMER | POLYESTER | QCT | 3 DAY | 3 DAY | QCT | 3 DAY | 3 DAY |
|---|---|---|---|---|---|---|---|---|
| 1 | L | R | 82.2 | 74.0 | 9MD | 82.2 | 60.0 | 7–9D |
| 2 | L | C | 81.0 | 73.5 | MicFM | 82.3 | 81.0 | 9M |
| 3 | M | C | 83.6 | 77.5 | MicFM | 81.0 | 82.0 | 9FM |
| 4 | M | S | 80.7 | 67.0 | 9D | 83.0 | 61.7 | 5–7D |
| 5 | M | T | 82.5 | 65.0 | 7–9D | 83.1 | 56.7 | 5–7D |
| 6 | M | U | 82.0 | 76.0 | MicF | 83.0 | 81.4 | 7–9MD |
| 7 | M | V | 82.2 | 73.7 | MicF | 84.2 | 79.1 | 9D |
| 8 | M | W | 82.9 | 78.0 | MicFM | 83.0 | 79.1 | 7–9MD |

QCT = 20 degree gloss when placed in Cleveland Condensing Cabinet witn water vapor at 120 degrees F., after one day ambient cure.
3 DAY = 20 degree gloss or blister after 3 days exposure of ambient aged panels.

Polyesters U and V, with low fumarate level, gave poorer cure as indicated by hardness at 14 days and poorer early cure as indicated by water spot test (ring at 9 hours) and some dulling when exposed to high humidity after 1 day ambient cure.

However, the most dramatic response was the much poorer water resistance of the hydroxyl terminated polyesters R, S, and T indicated by blistering when exposed to high humidity after 1 or 11 days ambient cure.

EXAMPLE 26

Effect of Acceptor Type/Level on Hardness and Color

This example demonstrates the superior color with TMPAOPATE as alkene component above a minimum level that is less than about 1 mole of alkene/mole of acetoacetate.

White paints were prepared as described in Example 25, using AAEM Copolymer N and either TMPAOPATE or the repeat of Polyester C described in Example 25. The binder composition for each paint contained a total of 9.15 grams AAEM copolymer plus alkene component (TMPAOPATE or Polyester C). The remainder was 0.6 grams Epon 828 and 0.25 grams bis-DMAPA. All paints also contained 0.2 grams p-t-butyl phenol and 0.01 grams Silicone SF-1023, with xylene as solvent. AAEM copolymer N was prepared with monomer composition 40 AAEM/55 i-BMA/5 Styrene, 1 weight percent 2,2'-azobis(2-methylbutanenitrile as initiator and 1% n-dodecyl mercaptan, and had Mw/Mn=21,900/9220.

Paints were drawn with a 7 mil gate on phosphatized cold rolled steel (Bonderite 1000). At 1 day ambient cure pieces were placed in an oven at 140 degrees F. for 24 hours, followed by measurement of hardness and yellowness. These properties were measured after 14 days cure at ambient. Results are shown in Table 18.

TABLE 18

White paint study of acceptor type/level.

| SAMPLE | ACCEPTOR | DONOR/ ACCEPT RATIO | ALKENE/ AAEM RATIO | KHN OVEN | DLTB OVEN | KHN 14 DA | PNCL 14 DA | DLTB 14 DA |
|---|---|---|---|---|---|---|---|---|
| 1 | None | 91.5/0 | 0.00 | 4.9 | 7.57 | 1.3 | 5B | 0.97 |
| 2 | TMPAOPATE | 85.5/6 | 0.13 | 4.9 | 1.75 | 1.3 | 3B | 0.51 |
| 3 | TMPAOPATE | 79.5/12 | 0.36 | 5.4 | 0.16 | 2.1 | B | 0.09 |
| 4 | TMPAOPATE | 73.5/18 | 0.63 | 6.8 | −0.33 | 3.8 | B | −0.18 |
| 5 | TMPAOPATE | 67.5/24 | 0.96 | 6.8 | −0.13 | 6.6 | F | −0.07 |
| 6 | TMPAOPATE | 61.5/30 | 1.33 | 7.6 | −0.20 | 8.8 | F | −0.12 |
| 7 | Polyester C | 54/37.5 | 1.59 | 8.7 | 5.92 | 6.5 | F | 2.22 |

EXAMPLE 27

Effect of Alkene/Acetoacetate on Color with Trimethylolpropane Triacrylate as Alkene Component This example shows that good color was obtained when the alkene/acetoacetate ratio was above about 2 and that good hardness was retained at an alkene/acetoacetate ratio of 3 with trimethylolpropane triacrylate as the alkene component.

White paints were prepared and tested as in Example 26, with AAEM Copolymer N and various levels of TMPTA as alkene component and a total of 9.4 grams AAEM copolymer plus TMPTA, with 0.6 grams Epon 828, 0.25 grams bis-DMAPA, and 0.2 grams p-t-butyl phenol.

Results are shown in Table 19. The abbreviations are the same as for Table 18.

TABLE 19

White paint study of various levels of TMPTA as alkene component.

| SAMPLE | ACCEPTOR | BINDER | ALKENE/ AAEM RATIO | KHN OVEN | DLTB OVEN | KHN 14 DA | PNCL 14 DA | DLTB 14 DA |
|---|---|---|---|---|---|---|---|---|
| 1 | TMPTA | 75/19/6 | 1.15 | 13.0 | 3.34 | 15.3 | 2H | 0.18 |
| 2 | TMPTA | 70/24/6 | 1.63 | 16.9 | 1.05 | 18.8 | 2H | −0.09 |
| 3 | TMPTA | 65/29/6 | 2.19 | 15.0 | 0.41 | 15.0 | 2H | −0.29 |
| 4 | TMPTA | 60/34/6 | 2.84 | 13.8 | −0.41 | 14.8 | 2H | −0.21 |
| 5 | TMPTA | 55/39/6 | 3.60 | 11.8 | 0.18 | 12.0 | 2H | −0.32 |

EXAMPLE 28

Demonstration of Superior Color with Malonate as Donor

A malonate functional acrylic copolymer was prepared by treatment of a hydroxyl functional acrylic with an excess of diethyl malonate in the presence of 0.5 wt % dibutyl tin oxide, removing ethanol formed by transesterification at a temperature of 180 degrees C. The hydroxyl function acrylic had composition 61.5 iBMA/26.2 HEMA/12.3 MMA, Mw/Mn=27,100/9630. The product was diluted with xylene, giving a solution having 65.8 weight percent of polymer with pendant malonate groups, about 218 grams polymer per active methylene group, in 75/25 xylene/diethyl malonate. The molecular weight as estimated by gel permeation chromatography was Mw/Mn=47,700/11,900.

AAEM copolymers O and P were prepared with 4.5 weight % t-butyl peroctoate. Copolymer O had monomer composition 40 AAEM/50 iBMA/10 MMA, Mw/Mn=16,500/6180. AAEM copolymer P had monomer composition 30 AAEM/50 iBMA/20 MMA, Mw/Mn=16,000/6080.

Clear enamels were prepared at 60 weight percent solids in xylene, with acrylic polymer plus alkene component=9.15 grams, 0.6 grams Epon 828, 0.25 grams bis-DMAPA, and 0.2 grams t-butyl phenol comprising the solids.

Alkene components used were Polyester R and TMPTA.

The enamels were drawn with a 7 mil gate on phosphatized cold rolled steel (Bonderite 1000) and two glass plates. One of the glass plates was held in an oven at 140 degrees F. for 24 hours after 1 day ambient cure. The other glass plate was kept at ambient with the steel panel. Table 20 shows the yellowness index for the heated plate and hardness and yellowness index at 14 days for the panel and ambient plate.

With the heat-aged panels there was much less yellowness with the malonate polymer as acceptor over the range of binder compositions tested.

TABLE 20

Clear film comparison of AAEM polymers and Malonate polymer with polyester R and TMPTA as acceptors.

| SAMPLE | CO-POLYMER | POLYESTER | BINDER | DONOR EQ | MOL RATIO | KCLR OVEN | KHN 14 DA | PNCL 14 DA | KCLR 14 DA |
|---|---|---|---|---|---|---|---|---|---|
| 1 | AAZM O | R | 61.5/30/6/2.5 | 111 | 1.0 | 10.76 | 5.8 | F | 2.35 |
| 2 | AZAM P | R | 61.5/30/6/2.5 | 83 | 1.4 | 8.95 | 4.0 | HB | 2.15 |
| 3 | Malonate | R | 61.5/30/6/2.5 | 101 | 1.1 | 5.56 | 5.1 | F | 2.30 |
| 4 | AAEM O | TMPTA | 76.5/15/6/2.5 | 138 | 0.9 | 7.13 | 9.2 | F | 1.61 |
| 5 | AAEM P | TMPTA | 76.5/15/6/2.5 | 103 | 1.2 | 5.61 | 10.1 | F | 1.18 |
| 6 | Malonate | TMPTA | 76.5/15/6/2.5 | 125 | 1.0 | 1.34 | 10.2 | F | 1.15 |
| 7 | AAEM O | TMPTA | 71.5/20/6/2.5 | 129 | 1.4 | 4.86 | 11.4 | H | 1.39 |
| 8 | AAEM P | TMPTA | 71.5/20/6/2.5 | 96 | 1.8 | 1.22 | 11.1 | H | 1.78 |
| 9 | Malonate | TMPTA | 71.5/20/6/2.5 | 117 | 1.5 | 0.72 | 10.5 | H | 1.15 |

EXAMPLE 29

Demonstration of Cure with Acetoacetate and Malonate Reactive Diluents and Color Advantage with Malonate Reactive Diluent Relative to Acetoacetate Preparation of tris-malonate and tris-acetoacetate reactive diluents is described in Examples 18 and 19. The AAEM polymer used was prepared with monomer composition 40 AAEM/55 iBMA/5 Styrene, using 2.3 weight percent based on monomers of 2,2'-azobis(2-methylbutanenitrile) as initiator. The molecular weights estimated by gel permeation chromatography were Mw/Mn=20,000/9120.

White paints with 4.29 grams titanium dioxide and 10 grams binder solids were tested with variation of weight ratio of AAEM polymer to polyester and with use of a combination of reactive diluent and AAEM polymer. The total weight of AAEM polymer plus reactive diluent plus polyester was 9.4 grams, with 0.6 Epon 828. The polyester was prepared from 20.4 NPG/9.7 DMCD/9.7 MAnh, aminated with 2.0 dimethylaminopropylamine. The fumarate/maleate ratio estimated by NMR was 85/15 and the molecular weights estimated by gel permeation chromatography were Mw/Mn=3730/1930.

Films were drawn with a 7 mil gate on phosphatized cold rolled steel (Bonderite 1000). Results are shown in Table 21.

iBMA/5 Styrene and 2.3 wt. percent 2,2'-azobis(2-methylbutanenitrile) as initiator, giving molecular weights Mw/Mn=19,400/8450. The polyester was prepared from 9.7 NPG/1 ED204/2.85 DMCD/6.85 MAnh, aminated with 0.5 bis-DMAPA, giving a fumarate/maleate ratio of 74/26 and Mw/Mn=5710/2230.

The isocyanate components were Isocyanate A, an m-tetramethylxylene diisocyanate/trimethylolpropane adduct with 8.6% isocyanate at 80% solids from American Cyanamid, and Isocyanate B, an isophorone diisocyanate trimer with 12.4% isocyanate at 70% solids from Chemische-Werke Huls.

The other binder component was Epon 828. Enamels were prepared at 50 weight percent solids with xylene as solvent. Comparison was made between a binder having no isocyanate and no preformed strong base (sample 3), the

TABLE 21

Comparison of tris-malonate and tris-acetoacetate diluents.

| REACTIVE DILUENT | WT RATIO | WTPC SOLD | VISC 4 MIN | KHN 14 DA | PNCL 14 DA | REV IMPACT | KCLR 14 DA |
|---|---|---|---|---|---|---|---|
| None | 34/0/60 | 57.2 | 40 | 5.2 | HB | 30–50 | 9.7 |
| None | 40/0/54 | 57.2 | 40 | 5.9 | HB | 30–50 | 9.9 |
| None | 46/0/48 | 57.2 | 56 | 4.9 | HB | 10–20 | 10.6 |
| TMPMal | 10/17/67 | 65.2 | 70 | 4.5 | HB | >110 | 9.7 |
| TMPAcAc | 10/17/67 | 65.2 | 70 | 1.9 | B | 20–30 | 12.6 |

The hardness with the malonate reactive diluent approached that of the binders without reactive diluent, while the color was as good and the viscosity/solids was much better. The acetoacetate reactive diluent gave poorer color and hardness.

EXAMPLE 30

Demonstration of Superior Chemical Resistance Properties with Use of Isocyanate and Hydroxyl Functional Polyesters Clear enamels were prepared with an AAEM copolymer prepared using monomer composition 40 AAEM/55 same binder but with 10 milliequivalents/100 grams binder strong base in the form of tetramethylguanidine carbonate (sample 4), and binders with replacement of part of the AAEM copolymer and polyester with isocyanate A or B (samples 1 and 2). The binders with isocyanate have about 1 isocyanate per hydroxyl end group of the polyester.

Films were drawn with a 7 mil gate on phosphatized cold rolled steel and glass (for measurement of swell ratio) and properties measured as shown in Table 22.

TABLE 22

Clear film evaluation of dual isocyanate/C-Michael cure.

| SAMPLE | ISO CYAN | BINDER | TMG-CARB | VISC 2 MIN | VISC TIM 2 | VISC TIM 3 | WATER SPOT | KHN 1 DA | KHN 7 DA | PNCL 7 DA |
|---|---|---|---|---|---|---|---|---|---|---|
| 1 | A | 28/5/50/17 | 0 | 92 | 140/2 hr | 260/3 hr | 6–7 | 1.7 | 9.6 | H |
| 2 | B | 30/5/53/12 | 0 | 64 | 254/98 m | 640/3 hr | 6–7 | 0.8 | 6.2 | F |
| 3 | None | 34/6/60/0 | 0 | 66 | 70/90 mn | 76/3 hr | >9 | 0.5 | 4.4 | HB |
| 4 | None | 34/6/60/0 | 10 | 70 | Glng 57 mn | Gel/75 mn | <3.5 | 0.6 | 4.1 | B |

| SAMPLE | SWRAT 7 DA | KHN 14 DA | PNCL 14 DA | HOAC 30 MN | HOAC 3.5 H | HOAC 6.5 H | NAOH 3.5 H | NAOH 6.5 H |
|---|---|---|---|---|---|---|---|---|
| 1 | 1.59 | 16.3 | H | HB | B | 6B/SlMWh | F | HB |
| 2 | 1.61 | 8.4 | F | F | HB | B | F | F |
| 3 | 1.61 | 6.8 | F | B | 3B | <6B | B/SlMWh | B/ModWh |
| 4 | 1.47 | 4.3 | HB | 2B | <6B | <6BBlstr | B/SlMWh | B/SlMWh |

ISO CYAN: Isocyanate.
BINDER: Weight ratio (solids) of AAEM copolymer/ Epon 828/Polyester/Isocyanate.
TMG-CARB: Meq. preformed strong base/100 grams binder.
VISC 2MIN: viscosity at 2 minutes after mixing (cps.).
VISC TIM 2: Viscosity/time (cps/minutes (mn) or hours (hr)).
VISC TIM 3: Viscosity/time (cps/minutes (mn) or hours (hr)).
WATER SPOT: Hours to absence of effect from drop of water allowed to dry on film.
KHN 1 DA: Knoop hardness at 1 day ambient cure.
KHN 7 DA: Knoop hardness at 7 days ambient cure.
PNCL 7 DA: Pencil hardness at 7 days ambient cure.
SWRAT 7 DA: Volumetric swell ratio in butyl acetate at 7 days ambient cure.
KHN 14 DA: Knoop hardness at 14 days ambient cure.
PNCL 14 DA: Pencil hardness at 14 days ambient cure.
HOAC 30 MN: Pencil hardness at 14 days after 30 minutes exposure to 10% acetic acid in water.
HOAC 3.5 H: Pencil hardness after 3.5 hours exposure to 10% acetic acid in water.
HOAC 6.5 H: Pencil hardness after 6.5 hours exposure to 10% acetic acid in water.
NAOH 3.5 H: Pencil hardness after 3.5 hours exposure to 10% sodium hydroxide in water.
NAOH 6.5 H: Pencil hardness after 6.5 hours exposure to 10% sodium hydroxide in water.
Glng: Gelling.
Gel: Gelled.
SlMWh: Slight to moderate whitening.
ModWh: Moderate whitening.

The samples with the isocyanates have superior resistance to aqueous acetic acid and aqueous sodium hydroxide.

We claim:

1. A method for reacting a methylene-containing component and an alkene-containing component comprising mixing and reacting a tertiary amine and an epoxide in the presence of the methylene-containing component and the alkene-containing component wherein the tertiary amine is selected from the group consisting of a tertiary amino-functional acrylic polymer; a tertiary amino-functional polyester; triethylenediamine; a compound containing both tertiary amine and primary or secondary amine; a Mannnich reaction product of a secondary amine, formaldehyde and a phenol; and mixtures thereof.

2. The method according to claim 1 wherein the tertiary amino-functional acrylic polymer is polymerized from a mixture comprising a tertiary amine-functional, ethylenically unsaturated comonomer selected from the group consisting of dimethylaminoethyl methacrylate, dimethylaminopropyl methacrylamide and mixtures thereof.

3. The method according to claim 1 wherein the tertiary amino-functional acrylic polymer includes the methylene-containing component.

4. The method according to claim 1 wherein the tertiary ammo-functional acrylic polymer further comprises acetoacetate functional groups.

5. The method according to claim 4 wherein the acrylic polymer is polymerized from monomers which comprise from about 2 to about 15 percent by weight of total monomer of tertiary amine functional monomer and from about 15 to about 60 percent by weight of total monomer of copolymerizable monomer containing the acetoacetate functional group.

6. The method according to claim 1 wherein the compound containing both tertiary amine and primary or secondary amine is selected from the group consisting of dimethylaminopropylamine, tetramethyliminobispropylamine and mixtures thereof.

7. The method according to claim 1 wherein the Mannich reaction product is a dimethylaminomethyl-substituted phenol.

8. The method according to claim 1 wherein the tertiary amino-functional polyester is prepared by reaction between a polyester containing an alpha-beta unsaturated ester containing component and a tertiary amine containing a primary or secondary amine group.

9. The method according to claim 8 wherein the tertiary amine is selected from the group consisting of dimethylaminopropylamine, tetramethyliminobispropylamine and mixtures thereof.

10. The method according to claim 8 wherein the alpha-beta unsaturated ester containing component is selected from the group consisting of maleate, fumarate, acrylate and acryloxypropionate.

11. The method according to claim 1 wherein the epoxide is selected from the group consisting of a mono- and poly-functional glycidyl compound, a polyepoxide derived from an alpha-olefin and mixtures thereof.

12. The method according to claim 11 wherein the mono- and poly-functional glycidyl compound is selected from the group consisting of a glycidyl-functional (meth)acrylic polymer, glycidyl-functional polyester and mixtures thereof.

13. The method according to claim 12 wherein the glycidyl-functional acrylic polymer is polymerized from a mixture including monomers selected from the group consisting of glycidyl acrylate, glycidyl methacrylate and mixtures thereof.

14. The method according to claim 13 wherein the glycidyl-functional acrylic polymer includes the methylene-containing component.

15. The method according to claim 14 wherein the methylene-containing component includes an acetoacetate functional group.

16. The method according to claim 15 wherein the acrylic polymer is polymerized from monomers which comprise from about 4 to about 20 percent by weight of total monomer of glycidyl functional monomer and from about 15 to about 60 percent by weight of total monomer of copolymerizable monomer containing the acetoacetate functional group.

17. The method according to claim 16 wherein the acetoacetate-functional monomer is selected from the group consisting of acetoacetoxyethyl methacrylate, acetoacetoxyethyl acrylate and mixtures thereof.

18. The method according to claim 1 wherein the epoxide is a glycidyl-functional acrylic polymer and the tertiary amine is triethylenediamine.

19. The method according to claim 1 wherein the epoxide is selected from the group consisting of a mono-, di- and tri-functional glycidyl compound and a polyepoxide of an alpha olefin, and the tertiary amine is selected from the group consisting of a tertiary amino-functional acrylic polymer, a tertiary amino-functional polyester, a compound having both a tertiary amine and a primary or secondary amine, and mixtures thereof.

20. The method according to claim 1, wherein the methylene-containing component is acetoacetate which is pendant from an acrylic polymer: and the alkene-containing component is an alpha-beta unsaturated ester selected from the group consisting of a poly-acrylate: a poly-beta-acryloxypropionate; a higher Michael addition product of acrylic acid: a poly-fumarate; a poly-maleate; and mixtures thereof.

21. The method according to claim 20 wherein the alpha-beta unsaturated ester is selected from the group consisting of a poly-beta-acryloxypropionate and a higher Michael addition product of acrylic acid.

22. The method according to claim 20 wherein the alpha-beta unsaturated ester is selected from the group consisting of poly-acrylates.

23. The method according to claim 20 wherein the alpha-beta unsaturated ester is selected from the group consisting of a poly-maleate and a poly-fumarate.

24. The method according to claim 23 wherein the poly-fumarate, poly-maleate or polyester containing both fumarate and maleate groups is a polyester having a number average molecular weight greater than about 500, an equivalent weight less than about 700 grams per alkene-containing component, and less than about 0.2 equivalents of acid per 100 grams.

25. The method according to claim 24 wherein the polyester is prepared from polyfunctional alcohols selected from the group consisting of neopentyl glycol, neopentyl glycol mono(hydroxypivalate), 2,2,4-trimethylpentyl-1,3-pentanediol, trimethylolpropane and mixtures thereof.

26. The method according to claim 24 wherein the number average molecular weight is greater than about 900, the equivalent weight is less than about 500 grams per alkene-containing component, and the acid level is less than about 0.1 equivalents per 100 grams.

27. The method according to claim 26 wherein the polyester containing both fumarate and maleate groups is prepared from polyfunctional alcohols selected from the group consisting of neopentyl glycol, neopentyl glycol mono (hydroxypivalate), trimethylolpropane and mixtures thereof, and the ratio of fumarate to maleate double bonds is between about 1 to 4 and about 4 to 1.

28. The method according to claim 27, wherein the ratio of fumarate to maleate double bonds is between about 2 to 3 and about 4 to 1.

29. The method according to claim 26 wherein the polyester is prepared from polyfunctional alcohols selected from the group consisting of neopentyl glycol, neopentyl glycol mono(hydroxypivalate), trimethylolpropane, and mixtures thereof, and wherein the alkene-containing component includes a dibasic acid component other than maleic acid and fumaric acid which is selected from the group consisting of aliphatic acid, cycloaliphatic acid and mixtures thereof.

30. The method according to claim 29 wherein the dibasic acid is cyclohexane dicarboxylic acid.

31. The method according to claim 29 wherein the acrylic polymer is about 30 percent to 50 percent by weight acetoacetoxyethylmethacrylate and greater than about 30 percent by weight of a compound selected from the group consisting of butylmethacrylate, isobutylmethacrylate and mixtures thereof.

32. A composition prepared by the method of claim 1.

33. The method according to claim 29 wherein the polyester has greater than 50 percent ester termination.

* * * * *